April 13, 1954  D. B. BECKER  2,675,134
AUTOMATIC MASTER LOAD WAREHOUSING
Filed July 7, 1949  19 Sheets-Sheet 1
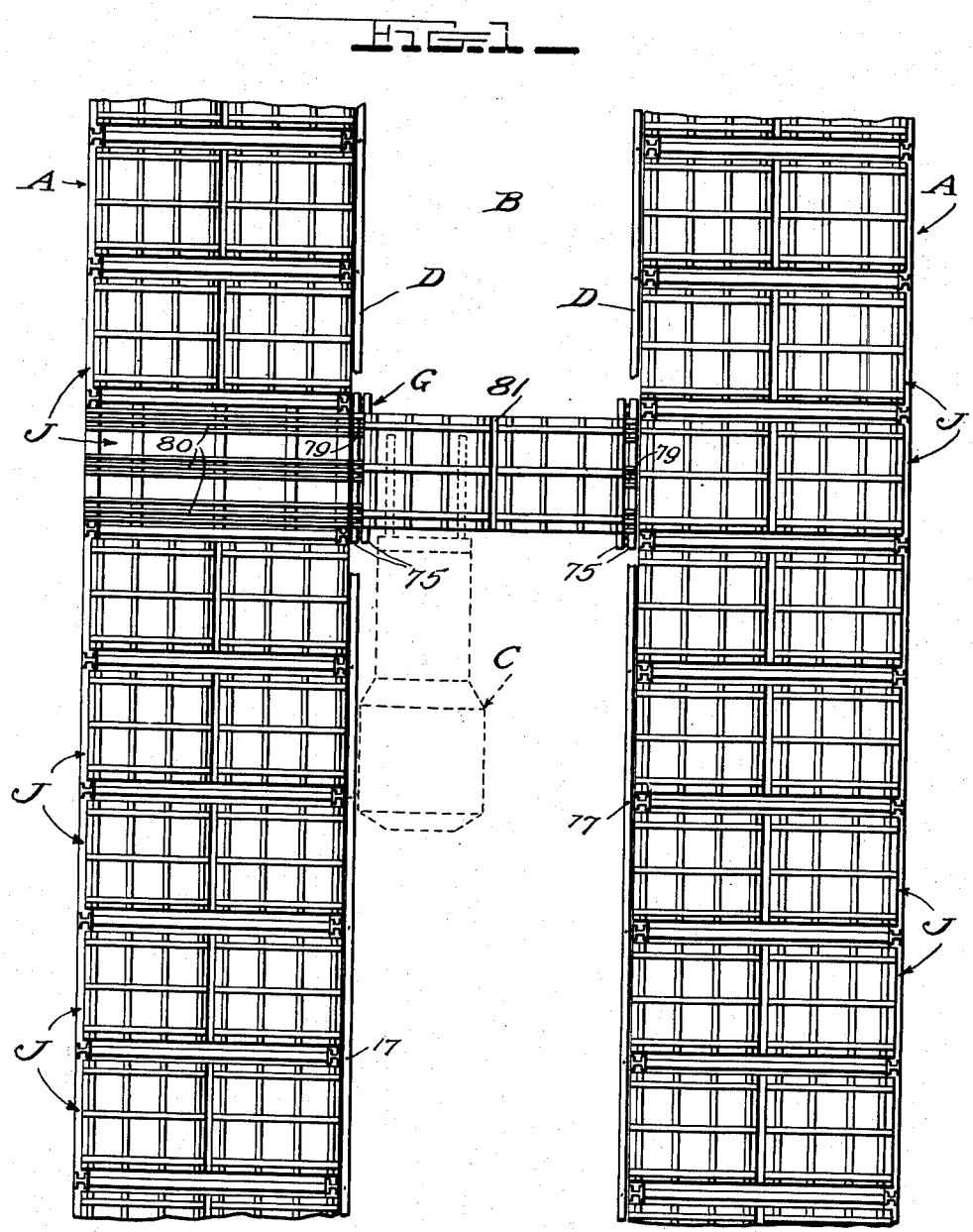
INVENTOR.
D. B. Becker
BY Bryant & Lowry
attys.

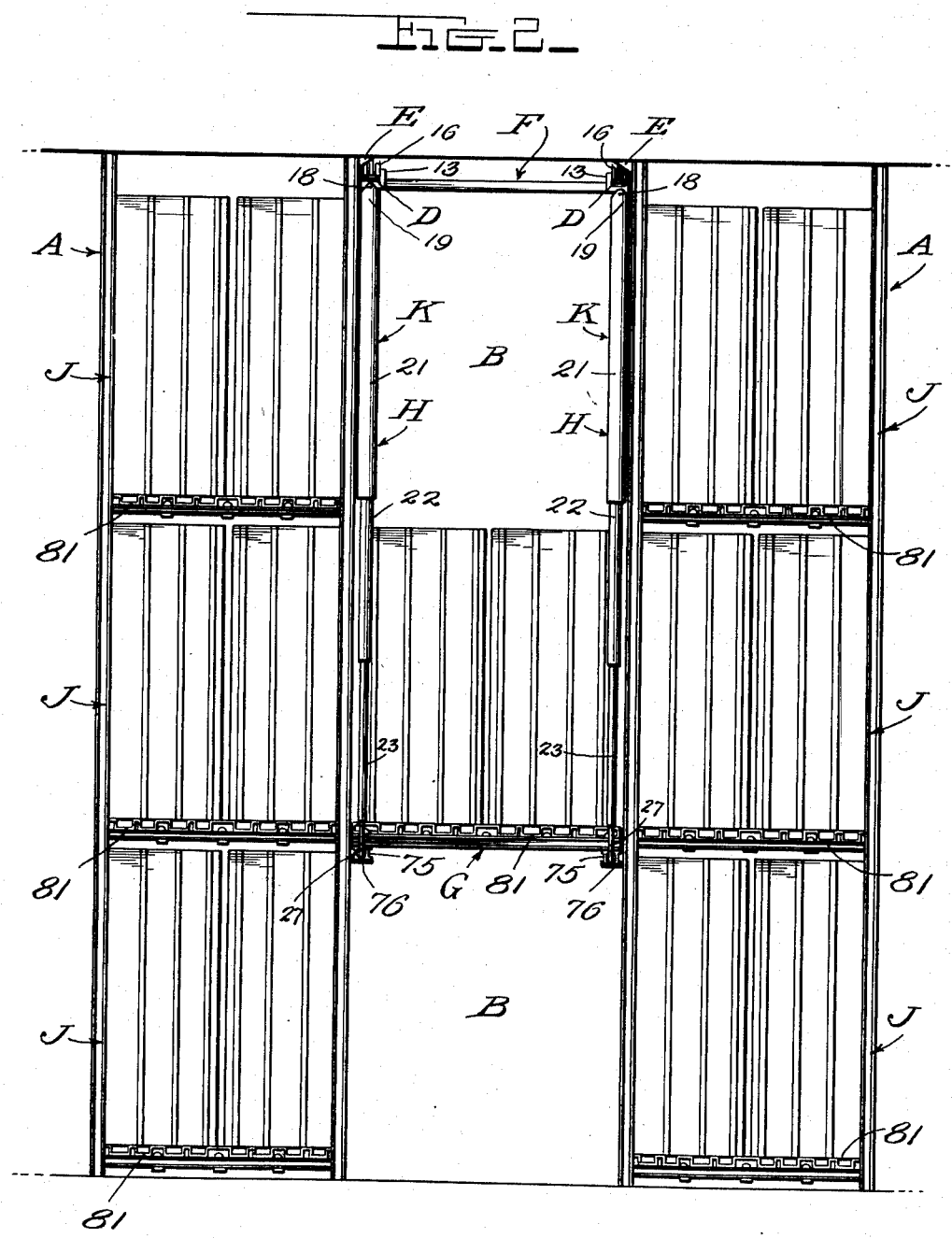

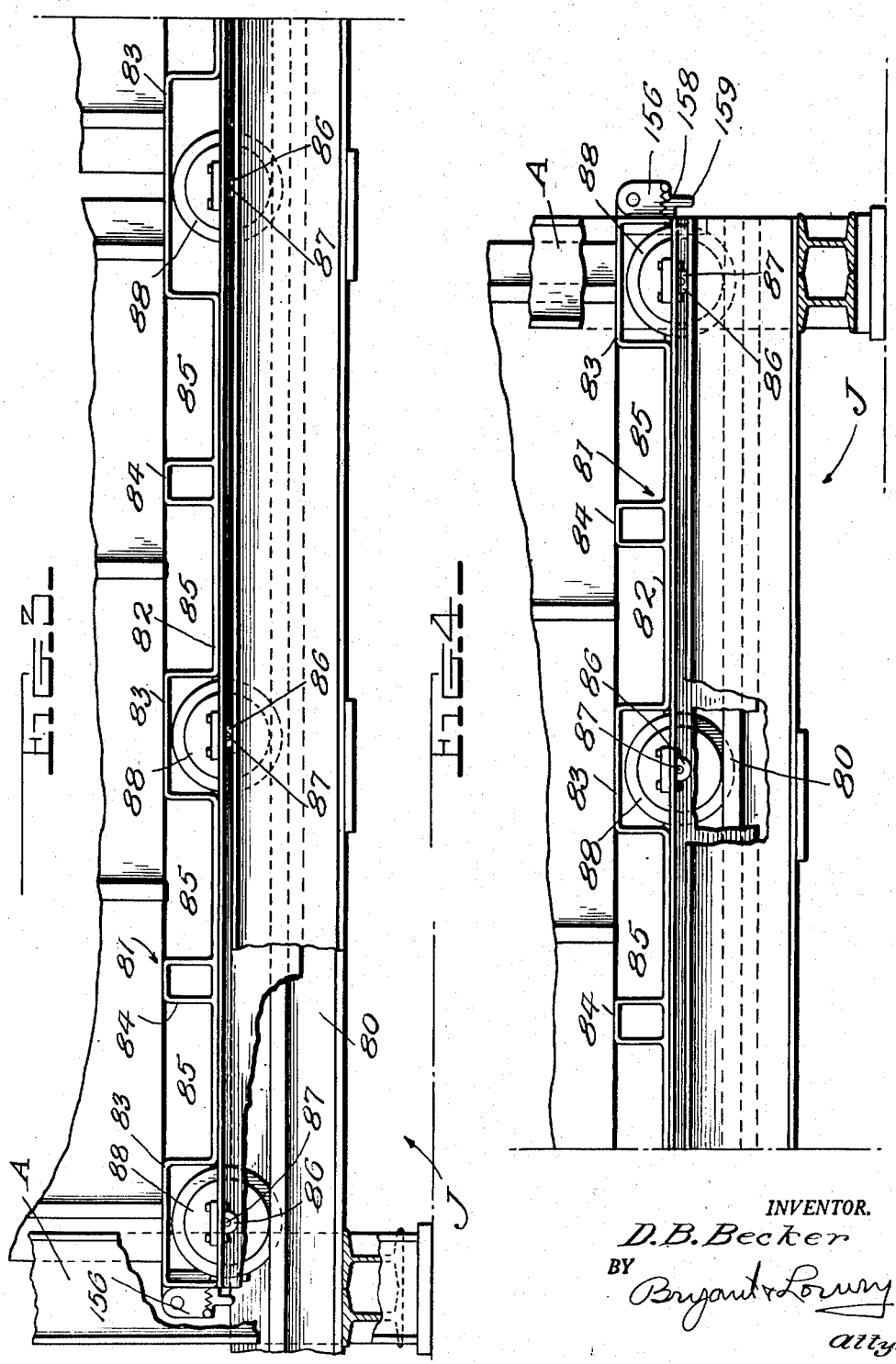

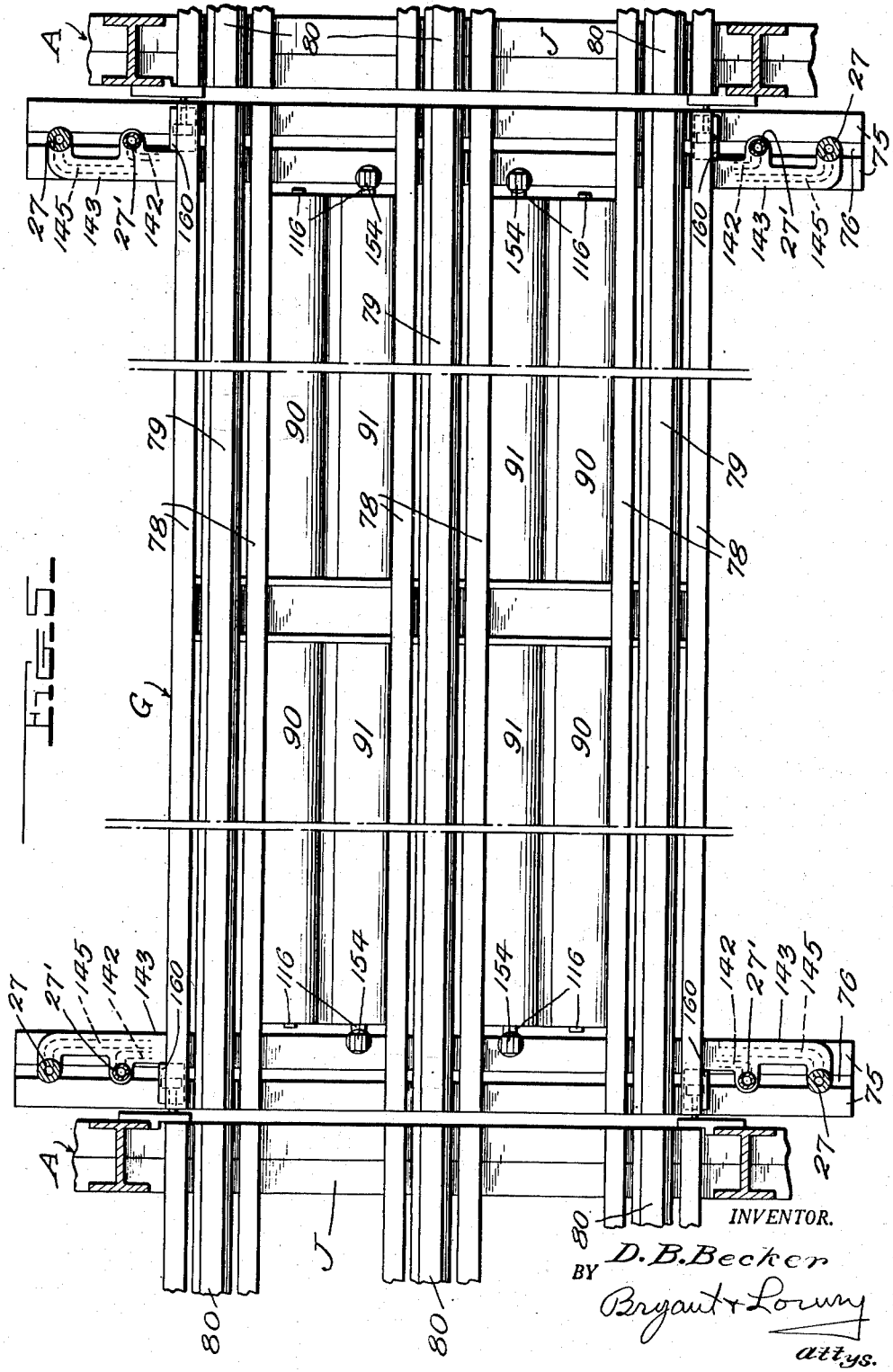

April 13, 1954   D. B. BECKER   2,675,134
AUTOMATIC MASTER LOAD WAREHOUSING
Filed July 7, 1949   19 Sheets-Sheet 5
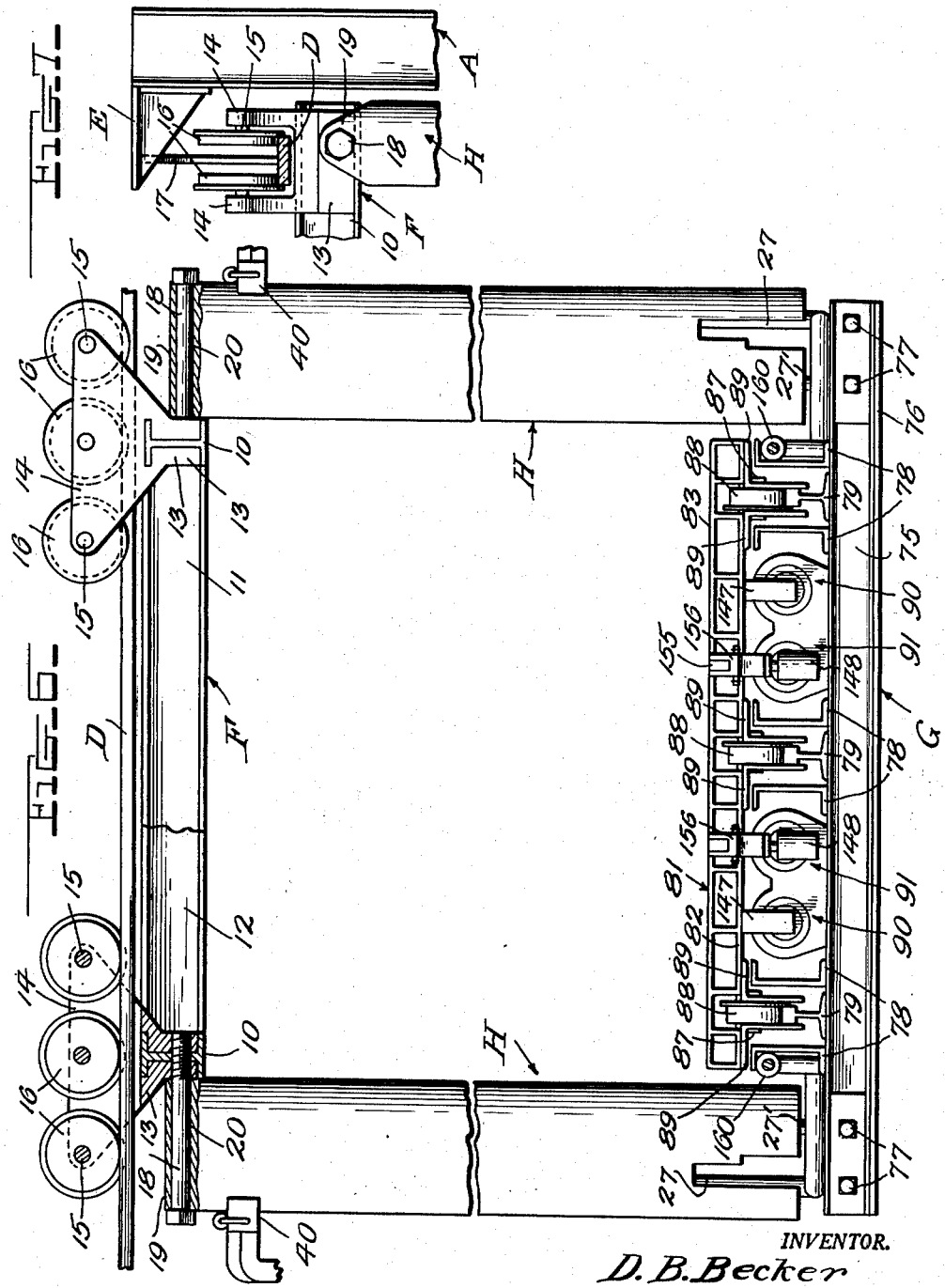
INVENTOR.
D. B. Becker
BY
Bryant + Lowry
attys.

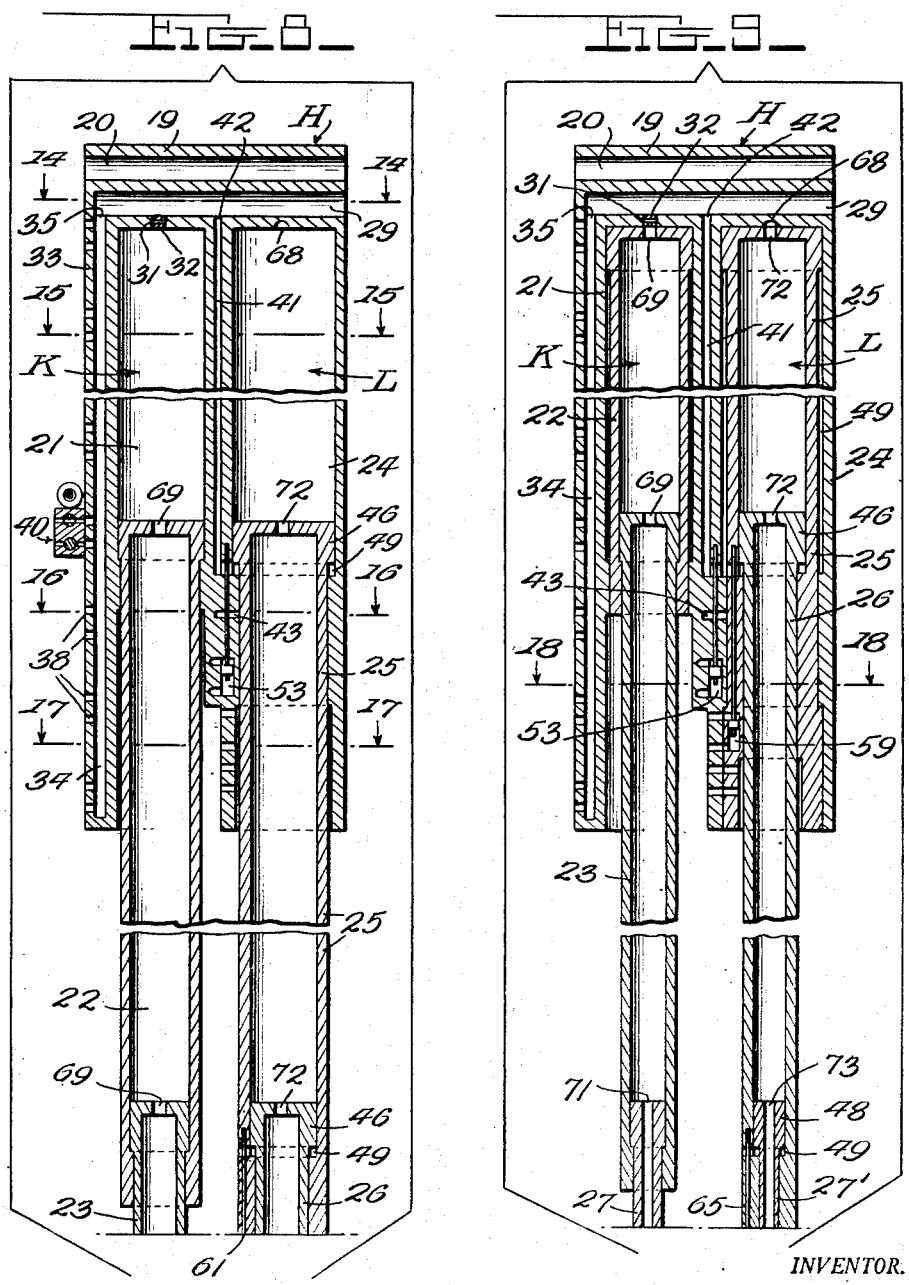

April 13, 1954 D. B. BECKER 2,675,134
AUTOMATIC MASTER LOAD WAREHOUSING
Filed July 7, 1949 19 Sheets-Sheet 7
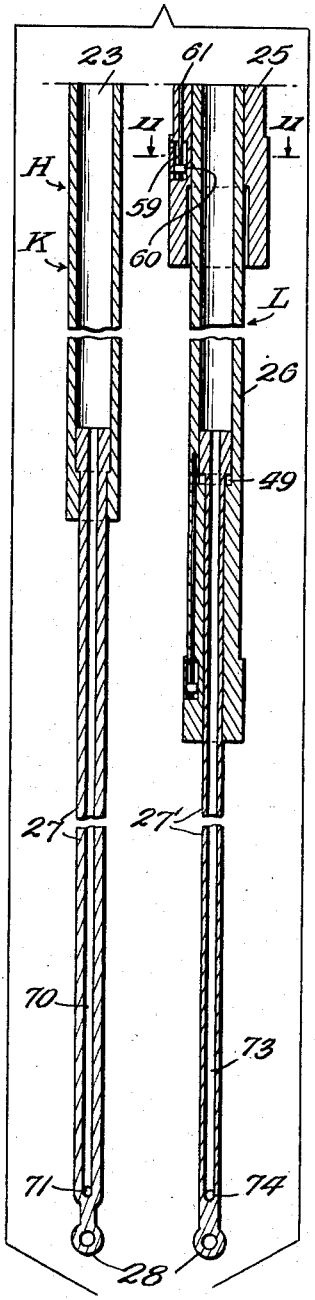
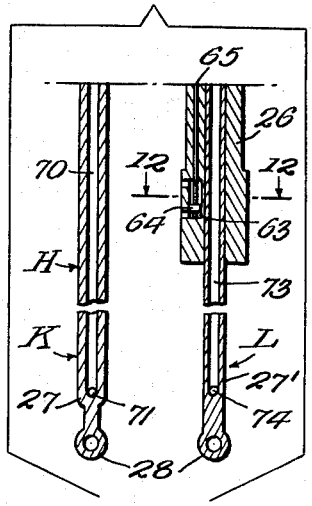
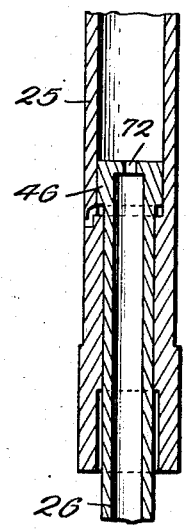
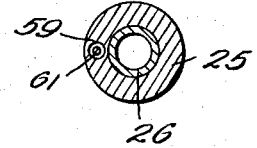
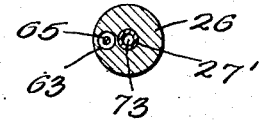
INVENTOR.
D. B. Becker
BY Bryant & Lowry
attys.

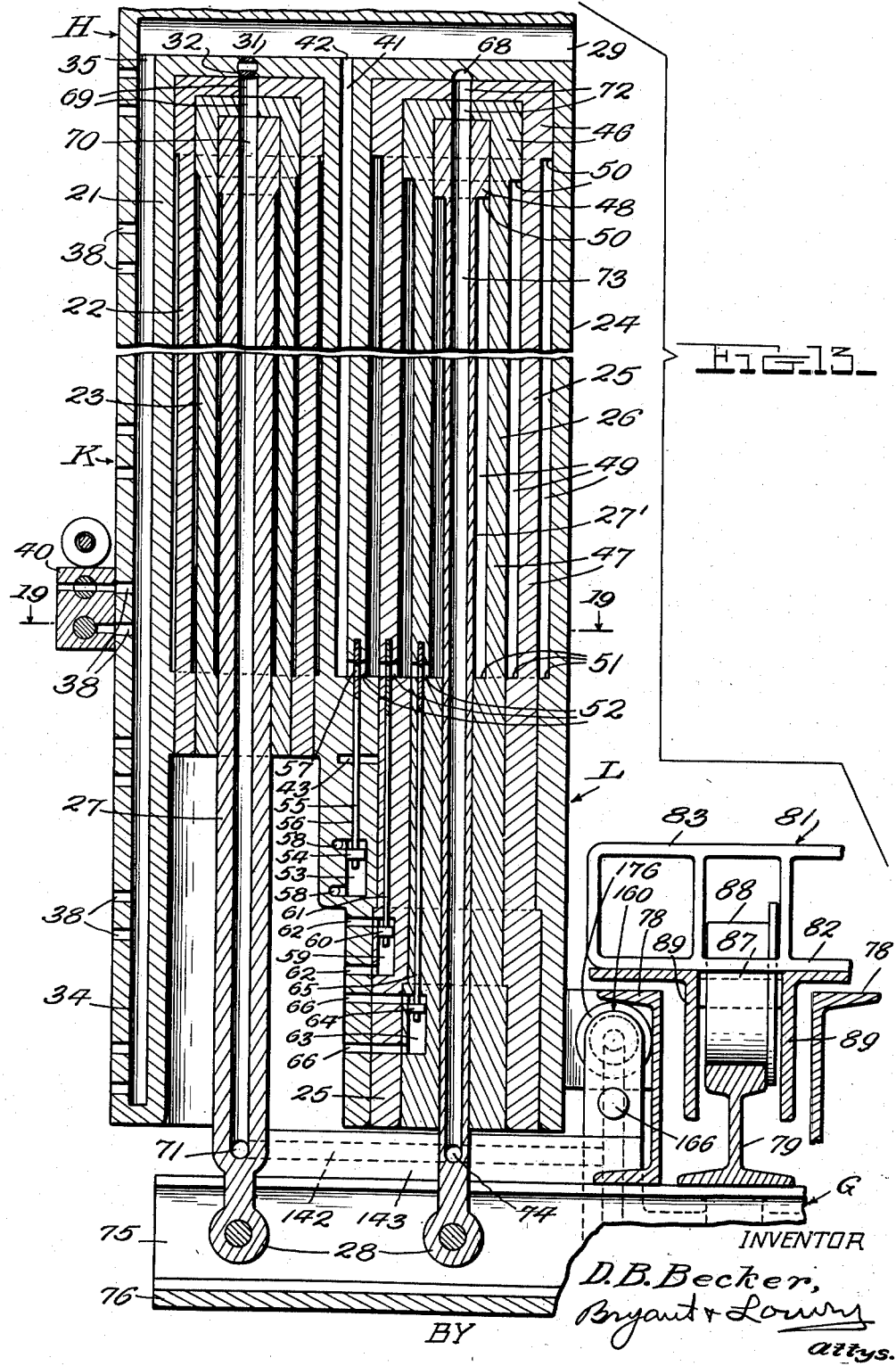

April 13, 1954  D. B. BECKER  2,675,134
AUTOMATIC MASTER LOAD WAREHOUSING
Filed July 7, 1949  19 Sheets-Sheet 9
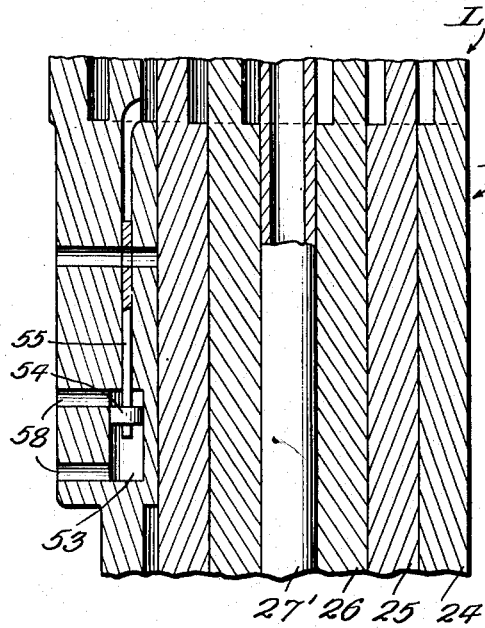
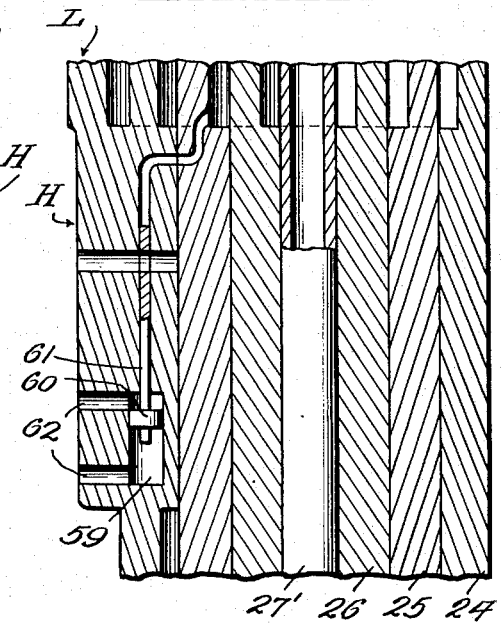
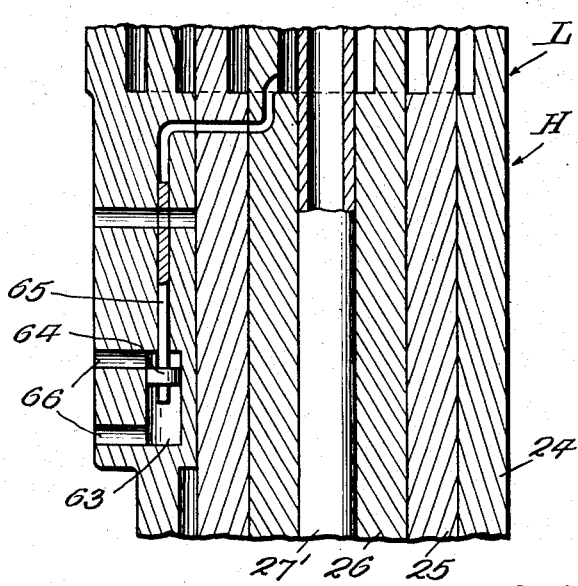
INVENTOR.
D. B. Becker
BY Bryant & Lowry
ATTYS.

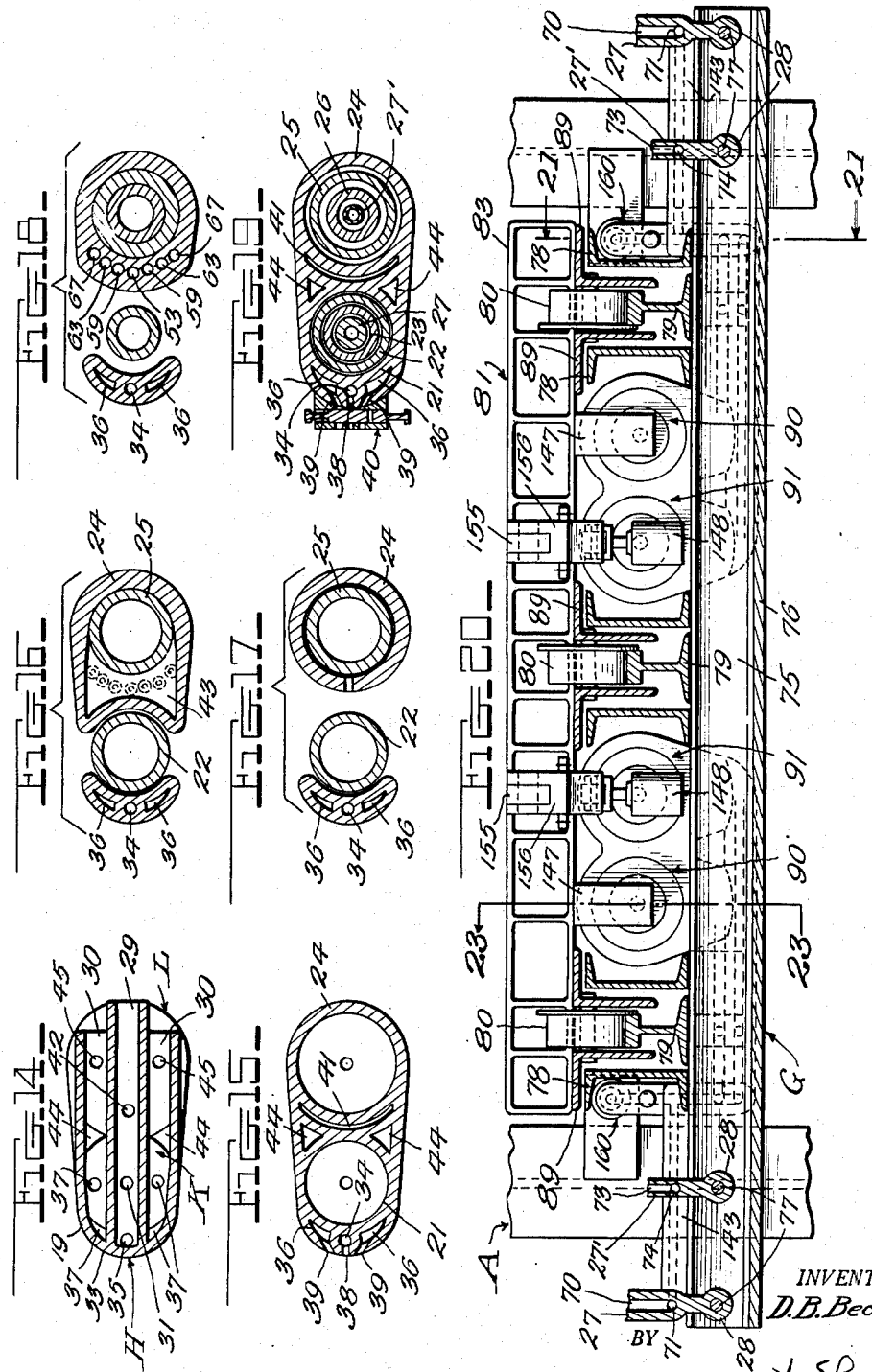

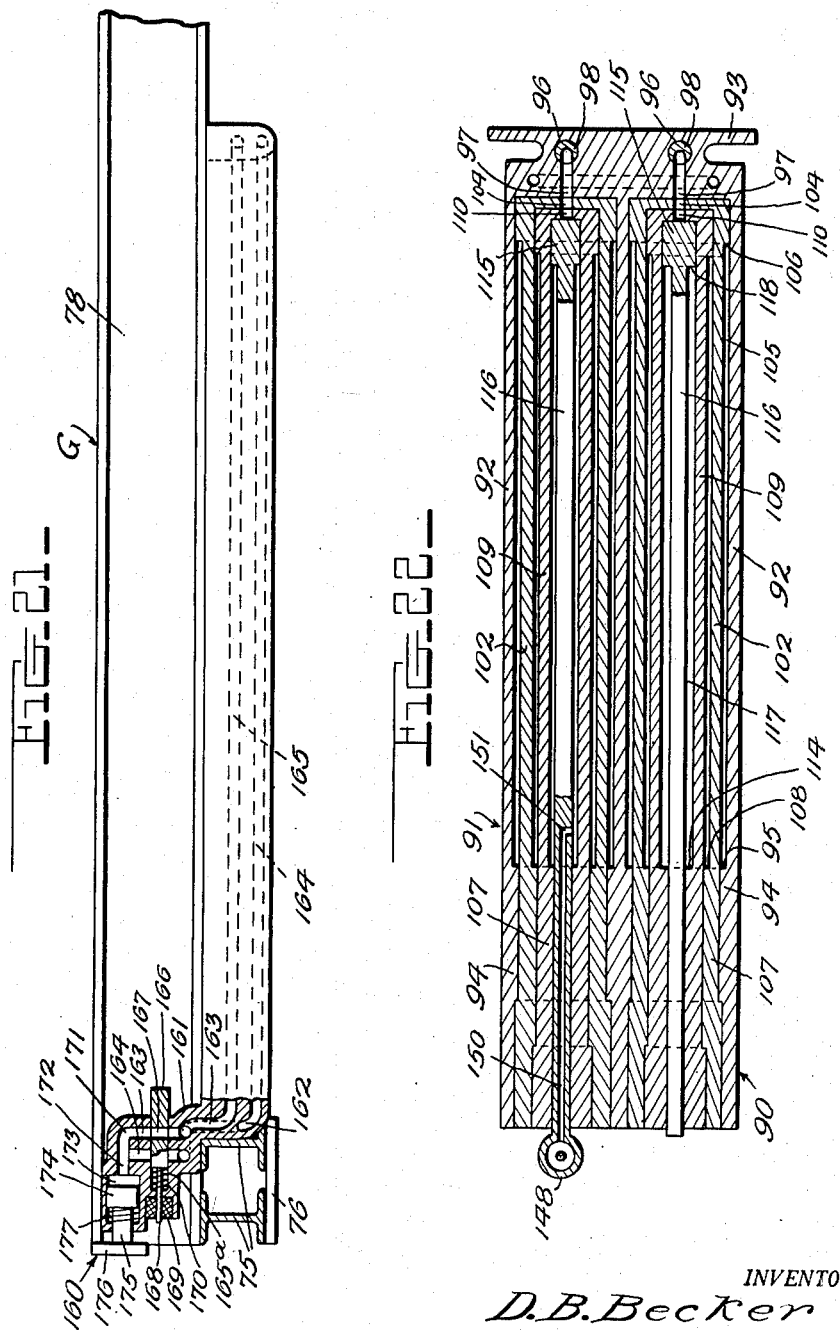

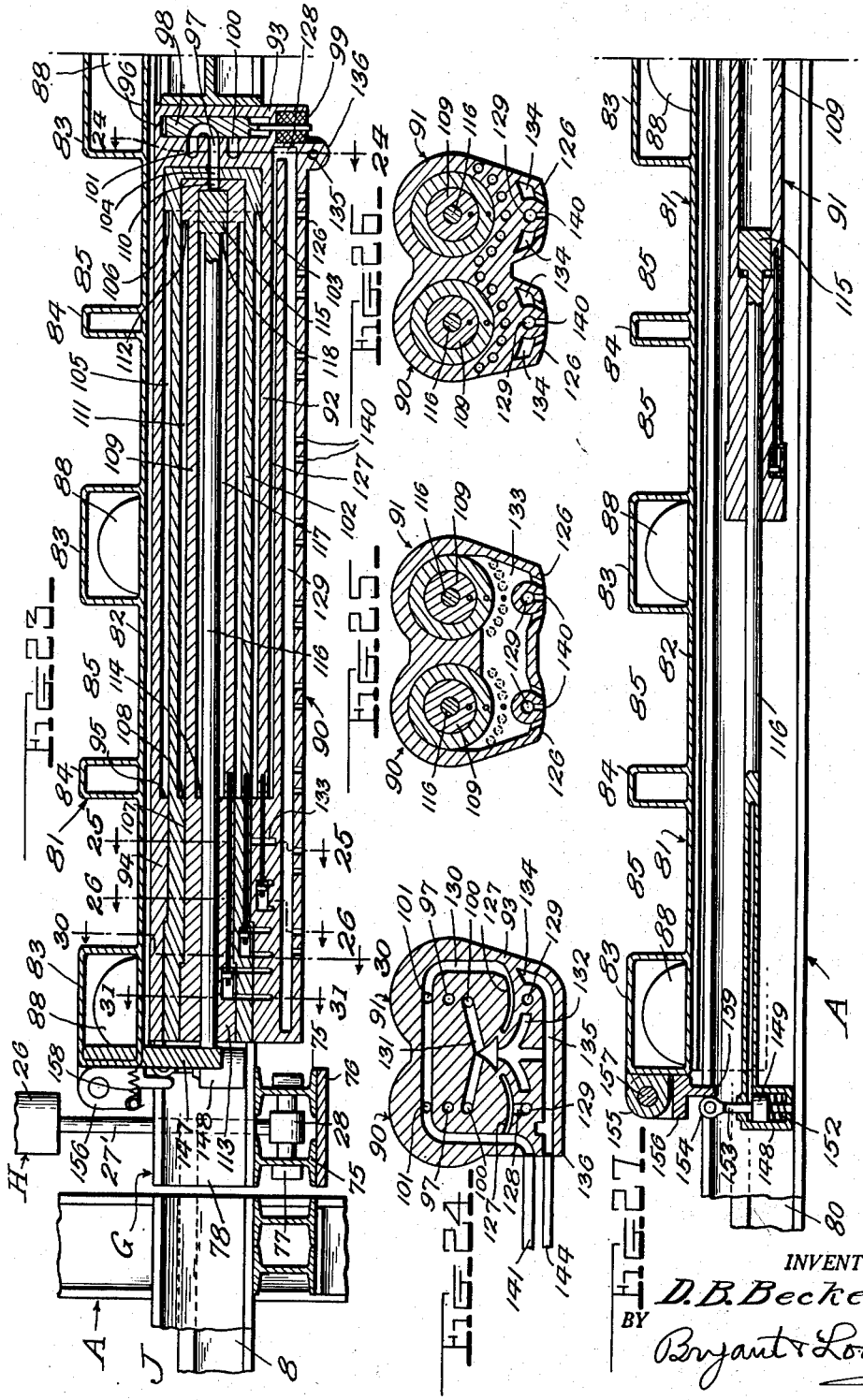

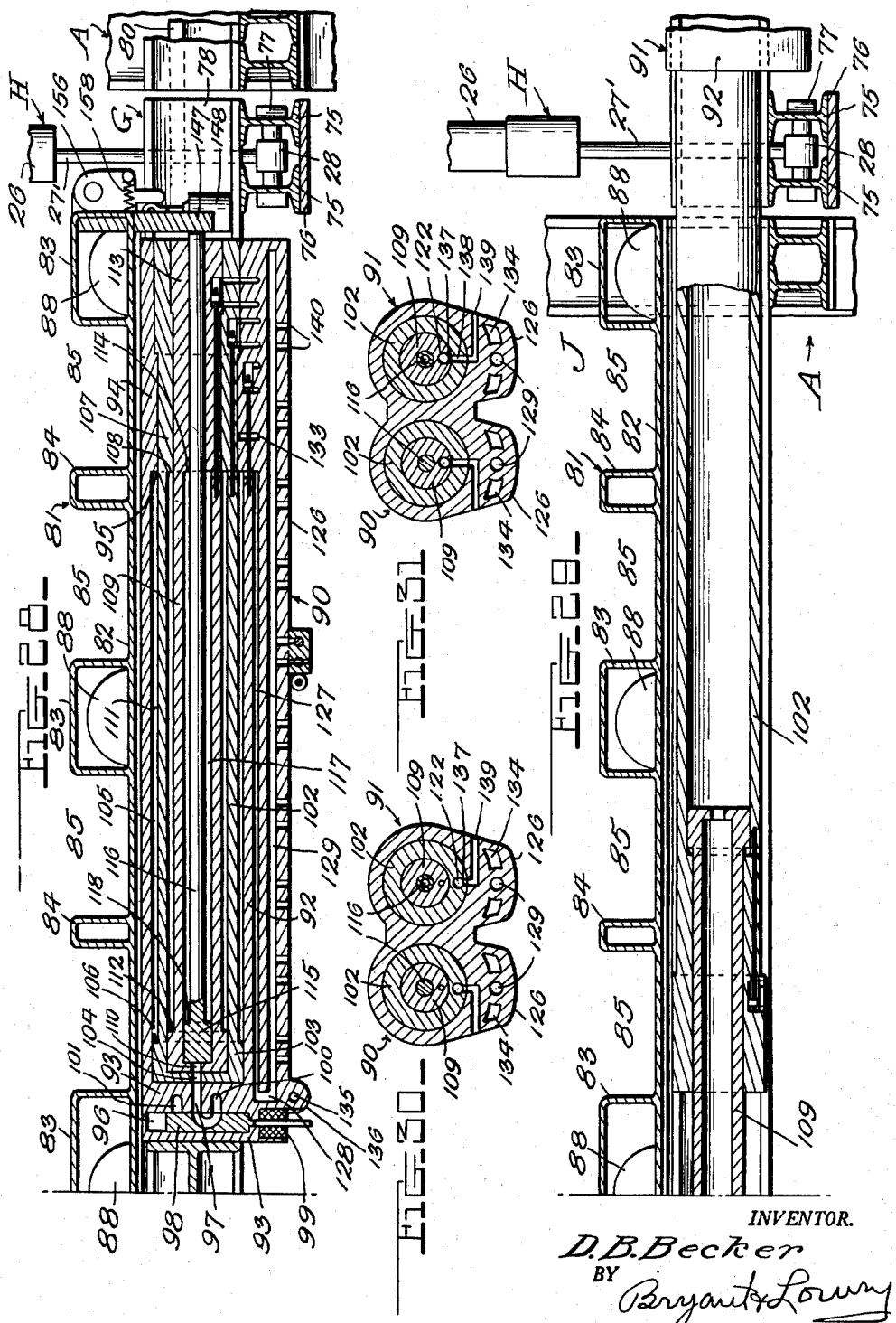

April 13, 1954     D. B. BECKER     2,675,134
AUTOMATIC MASTER LOAD WAREHOUSING
Filed July 7, 1949     19 Sheets-Sheet 14
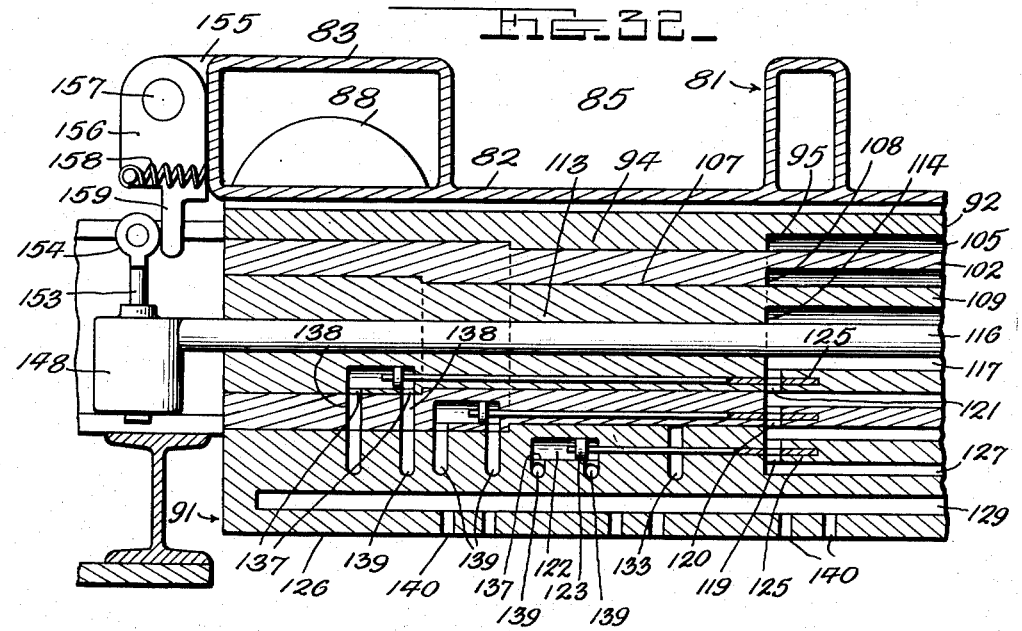
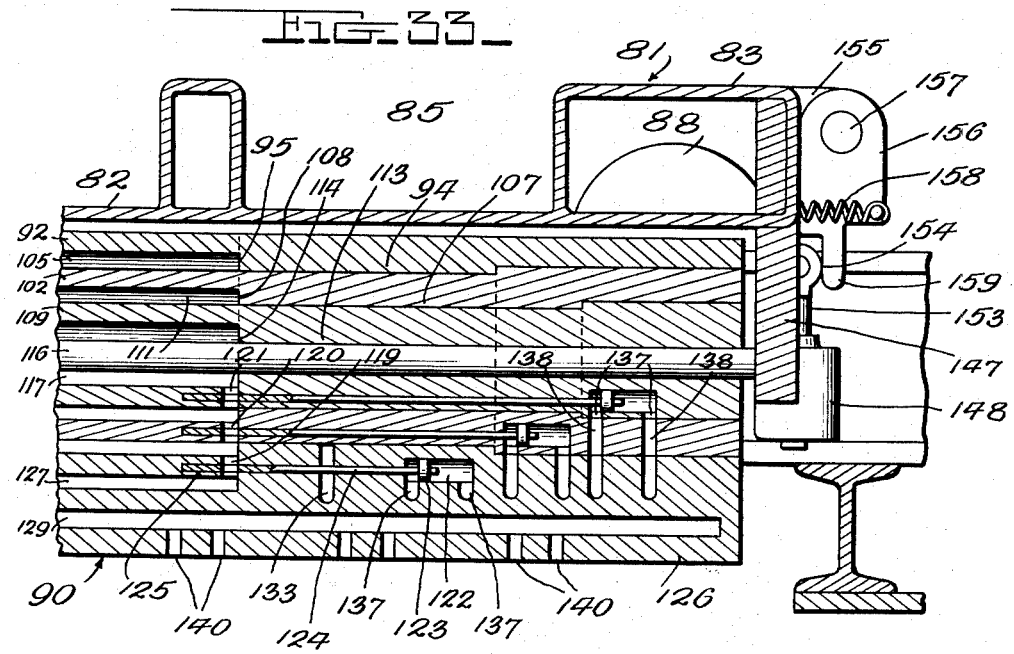
INVENTOR.
D. B. Becker
BY Bryant & Lowry
attys

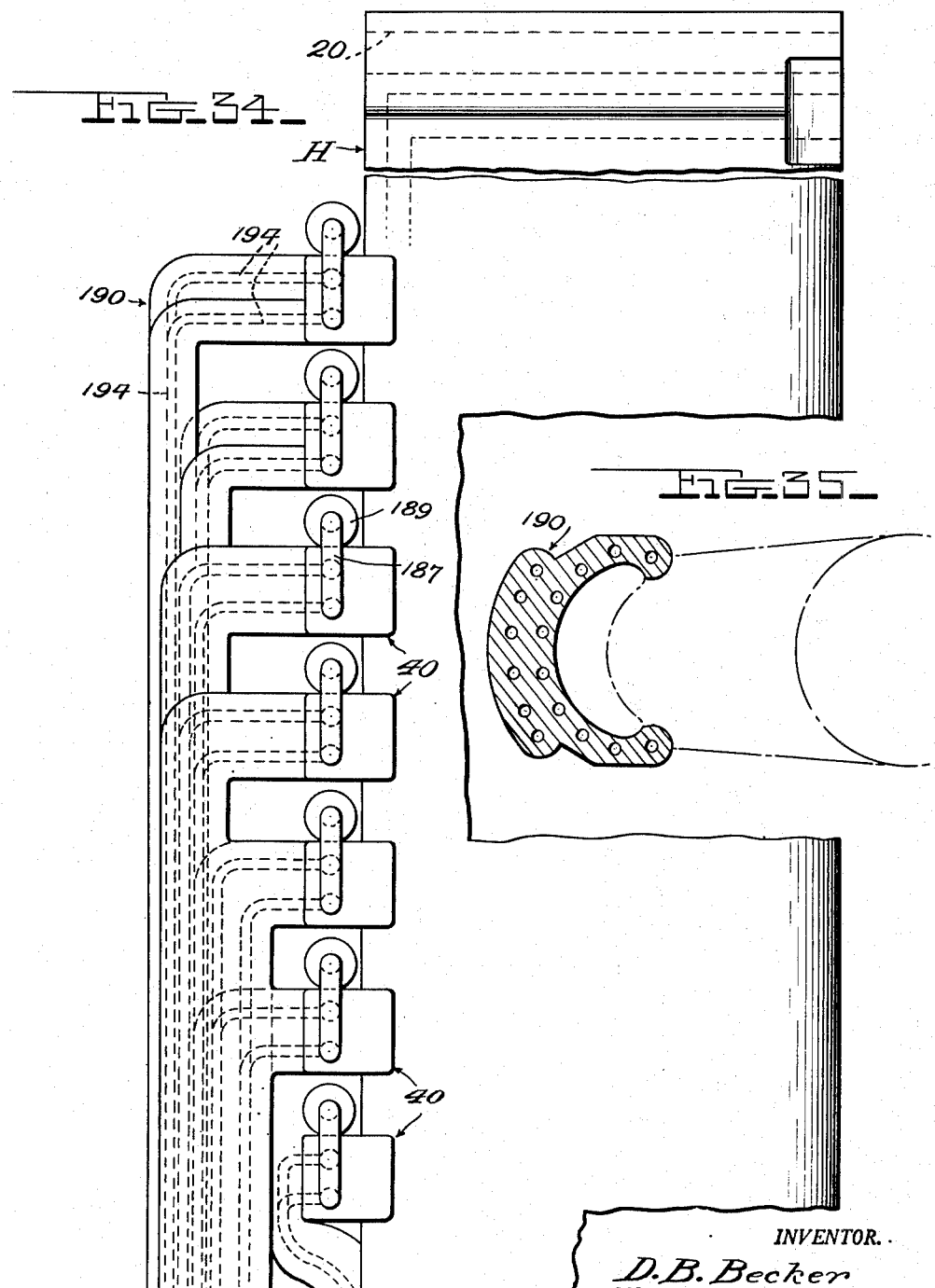

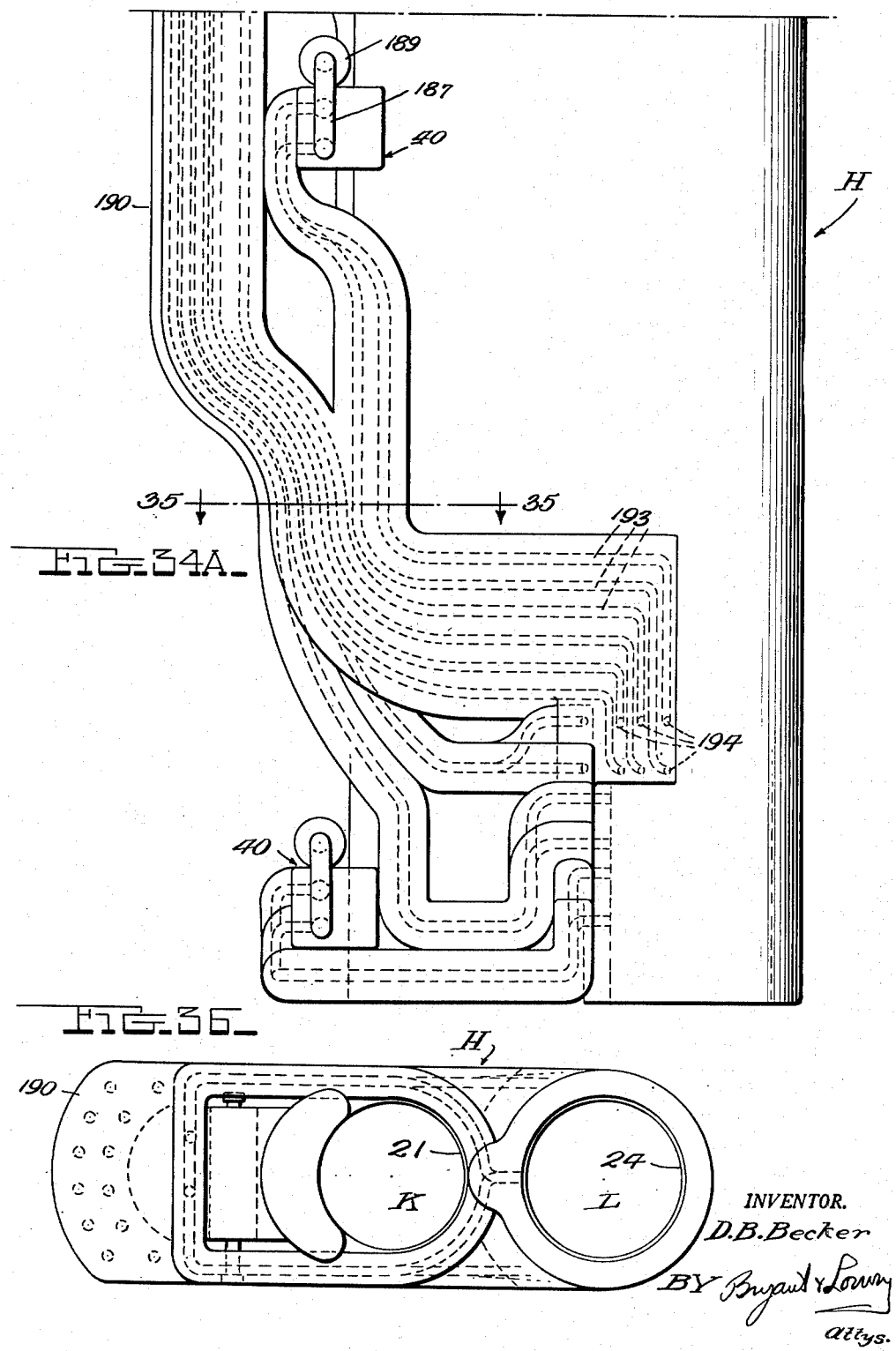

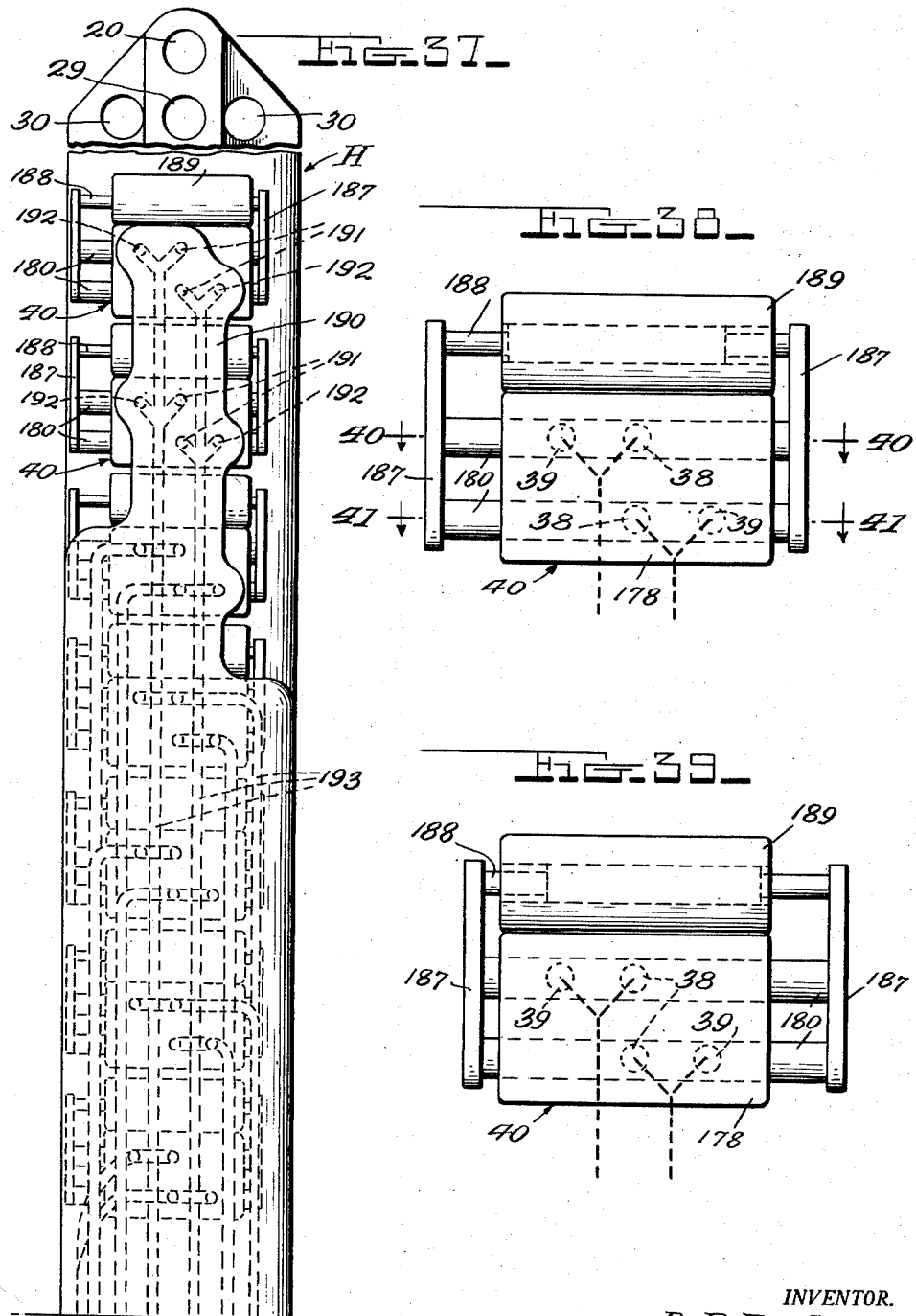

April 13, 1954 D. B. BECKER 2,675,134
AUTOMATIC MASTER LOAD WAREHOUSING
Filed July 7, 1949 19 Sheets-Sheet 18

INVENTOR.
D. B. Becker
BY Bryant & Lowry
attys

April 13, 1954 — D. B. BECKER — 2,675,134
AUTOMATIC MASTER LOAD WAREHOUSING
Filed July 7, 1949 — 19 Sheets-Sheet 19
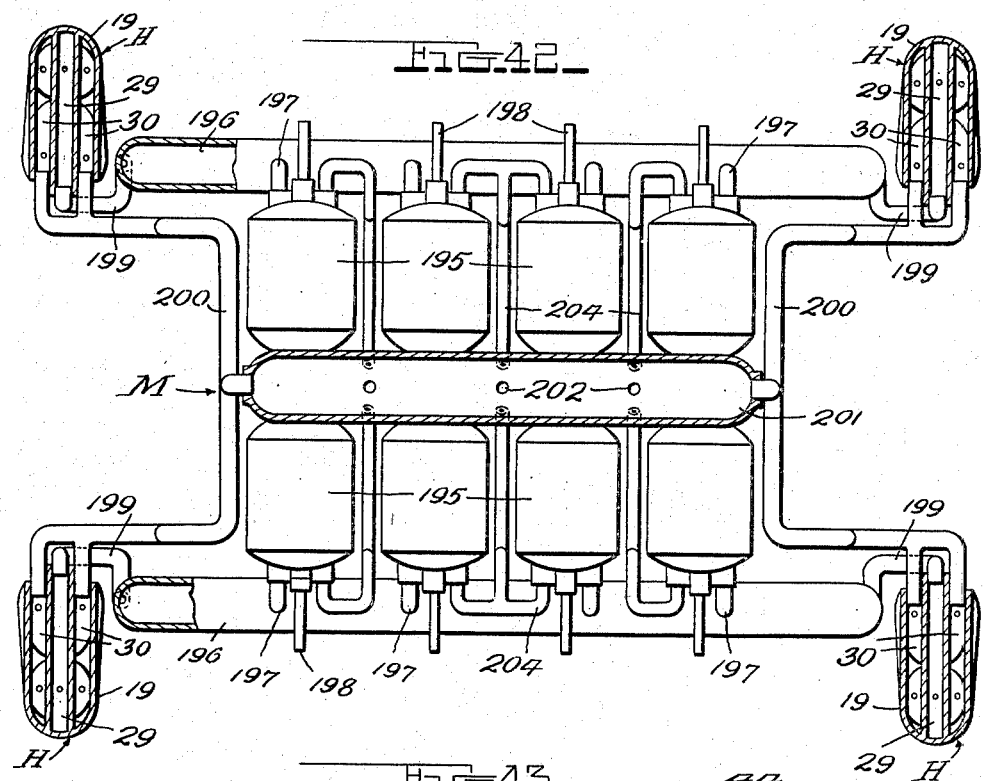
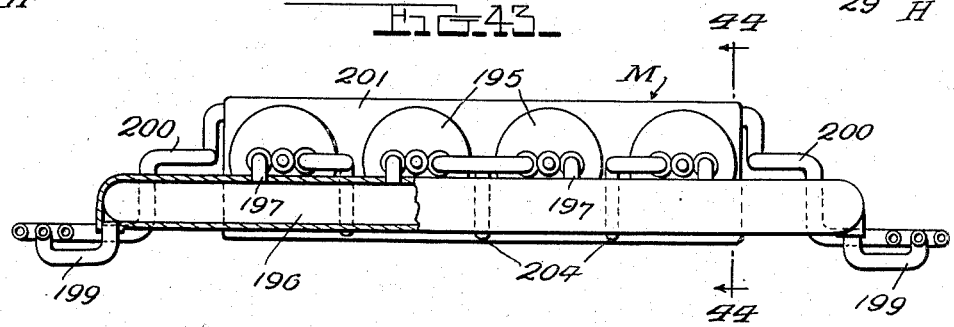
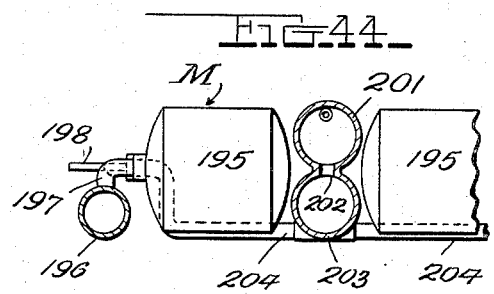
INVENTOR.
D. B. Becker
BY Bryant + Lowry
attys.

Patented Apr. 13, 1954

2,675,134

UNITED STATES PATENT OFFICE 2,675,134

AUTOMATIC MASTER LOAD WAREHOUSING

Dean B. Becker, Fort Atkinson, Wis.

Application July 7, 1949, Serial No. 103,461

10 Claims. (Cl. 214—16.12)

This invention relates to the storage of material in warehouses and has special reference to means for conveying material to be stored to the point of storage, there placing it and then, when desired, withdrawing it. It is recognized that it has been customary to place material for storage on a pallet which is a small platform upon which can be stacked a charge of merchandise or product. It is recognized that it is quite customary to shift such pallets from one place to the other by mechanical means. These pallets are picked up and transported by lift trucks, or the like, but therefore there is a distinct limitation to the load capacity of this work.

It is one of the principal objects of this invention to provide mechanism whereby a full master load of any product without being placed on a pallet may be suitably stored in a warehouse by mechanical means and withdrawn therefrom as desired.

Another important object of the invention is to provide a mechanism whereby heavy loads of material may be moved from one place or another beside a warehouse, raised to the proper position for disposition and there placed in the warehouse without manual intervention, such load of material being as readily withdrawn from the warehouse position.

Another important object of the invention is to arrange the depositing structure and the warehouse so that no necessity is afforded of placing one load on top of the other, a common practice with loads carried on pallets.

Another important object of the invention is to provide a novel mechanism for handling materials stored in a warehouse whereby such materials are immediately available for withdrawal from the warehouse without making it necessary to move any other materials.

A further important object of the invention is to provide a mechanism whereby any of the materials in the warehouse may be instantly removed without interference with other materials therein.

A still further object of the invention is to provide a warehousing mechanism by which a load of materials may be stored in the warehouse and never moved out of the way of other materials stored therein until it is desired to withdraw the particular materials from the warehouse.

Another important object of the invention is to provide a mechanism whereby material may be withdrawn from a warehouse at any time without interfering with material which has been deposited later.

Another important feature of the invention is to provide a mechanism having a novel construction of retractable storage beds eliminating the necessity for using a pallet whereby material may be readily moved into and out of a warehouse.

Again it is an object of the invention to provide a mechanism for storage of material in and withdrawal of the same from a warehouse thereby requiring life truck operation parallel with the longitudinal axis of the aisle only eliminating the necessarily wide aisles required when life trucks are used in order to carry material from one point to the other in the warehouse, and thereby not requiring aisles of sufficient width to allow a turning radius for operation perpendicular to the longitudinal axis of the aisles.

With the above and other objects in view the invention consists in general of certain novel details of construction and combinations of parts, hereinafter fully described, illustrated in the accompanying drawings and particularly claimed, like characters of reference indicating like parts in the several views; and Figure 1 is a diagrammatic plan view of arrangement of warehouses and the apparatus for placing and removing loads;

Figure 2 is an end elevation of the arrangement shown in Figure 1, the view being taken looking along the aisle between the warehouses;

Figure 3 is a partial side view of one of the retractable storage beds used in this invention, showing said retractable storage bed within one of the compartments of warehouse;

Figure 4 shows a continuation of the right-hand side of Figure 3;

Figure 5 is a plan view partly in section, showing the arrangement of the transfer bridge;

Figure 6 is an elevational view partly in section of the crane transfer bridge, showing the retractable storage bed drawn out of warehouse onto said bridge, and the suspension means for the bridge;

Figure 7 is a detailed view looking from the upper right-hand part of Figure 6;

Figure 8 is a detailed view showing certain of the elevating means used in connection with this invention;

Figure 9 is a sectional view showing the telescopic elevating mechanism;

Figure 8A is a view showing a continuation downwardly of Figure 8;

Figure 9A is a view showing a continuation downwardly of Figure 9;

Figure 10 is a sectional view of one of the elevating means shown in Figure 8;

Figure 11 is a section on the line 11—11 of Figure 8A;

Figure 12 is a section on the line 12—12 of Figure 9A;

Figure 13 is an enlarged sectional view showing the nesting of the elevating cylinders used herein;

Figure 13A is a still more enlarged section taken on a radial plane through the axes of the cylinders and chamber shown herein;

Figure 13B is a still more enlarged section taken on a radial plane through the axes of the cylinders and a second chamber shown herein;

Figure 13C is a still more enlarged section taken on a radial plane through the axes of the cylinders and a third chamber shown herein;

Figure 14 is a section on the line 14—14 of Figure 8;

Figure 15 is a section on the line 15—15 of Figure 8;

Figure 16 is a section on the line 16—16 of Figure 8;

Figure 17 is a section on the line 17—17 of Figure 8;

Figure 18 is a section on the line 18—18 of Figure 9;

Figure 19 is a section on the line 19—19 of Figure 13;

Figure 20 is a view illustrating a portion of the transfer bridge, with retractable storage bed pulled out of warehouse onto said bridge, the view being partly in side elevation and partly in section;

Figure 21 is a detailed section on the line 21—21 of Figure 20;

Figure 22 is a somewhat enlarged section showing the nesting of certain of the transfer bridge cylinders used herein;

Figure 23 is a detailed section on the line 23—23 of Figure 20;

Figure 24 is a section on the line 24—24 of Figure 23;

Figure 25 is a section on the line 25—25 of Figure 23;

Figure 26 is a section on the line 26—26 of Figure 23;

Figure 27 is a fragmentary section showing a portion of the lateral transfer cylinders and showing a puller toe used herein in contact position for pulling of retractable storage bed out of warehouse space onto the transfer bridge;

Figure 28 is a view similar to Figure 23 but showing the opposite end of the transfer bridge;

Figure 29 is a view showing a continuation of the parts shown in Figure 27;

Figure 30 is a section on the line 30—30 of Figure 23;

Figure 31 is a section on the line 31—31 of Figure 23;

Figure 32 is an enlarged vertical median section through the axis of the outboard end of a certain retractable storage bed puller device and showing associated parts of the transfer bridge and retractable storage bed used herein;

Figure 33 is a similar view to Figure 32 but showing a retractable storage bed pusher;

Figure 34 is an enlarged side view of the upper part of one of the lift arangements showing all the solenoid controlled valves in place;

Figure 34A is a similar view of the lower part of this lift arrangement;

Figure 35 is a section on the line 35—35 of Figure 34A;

Figure 36 is a bottom plan view of the means disclosed in Figure 34A;

Figure 37 is an elevation showing the left side of Figure 34;

Figure 38 is an enlarged right side view of one of solenoid controlled valves removed from the cylinder structure, the slide portions of the valve being in one position;

Figure 39 is a view similar to Figure 38 but showing the slide portions in a second position;

Figure 42 is a plan view partly in section of a hydraulic power plant adapted to be carried by the traveling crane used herein;

Figure 43 is a side elevation of the power plant partly in section; and

Figure 44 is a section taken on the line 44—44 of Figure 43.

In general

The invention as here disclosed is shown as operating between a pair of storage warehouses A, A, which extend along parallel lines to provide an aisle B between them for the movement of material transporting lift trucks one of which is shown at C. Extending along the sides of this aisle are crane runway rails D here shown as carried by brackets E fixed to the steel framing of the warehouse compartments J. However, the runway rails may be supported in any conventional manner and are not necessarily connected to the warehouse compartments. The invention itself includes four main parts, indicated in general at F, G, H and 81, to be later specifically described; F indicating a crane running on said runway, G an elevator-like platform, H a hydraulic means connecting the crane and platform which is preferably termed a transfer bridge and serving to raise and lower said transfer bridge, and 81 retractable storage beds upon which master loads are warehoused.

As shown in Figure 1, where one floor of a warehouse is shown, each warehouse is formed with a like series of tiers or compartments J.

For the sake of avoiding complications in the main drawings, no power plant M has been shown as mounted on the crane. However, a power plant is disclosed in Figures 42, 43 and 44.

Figure 37A:
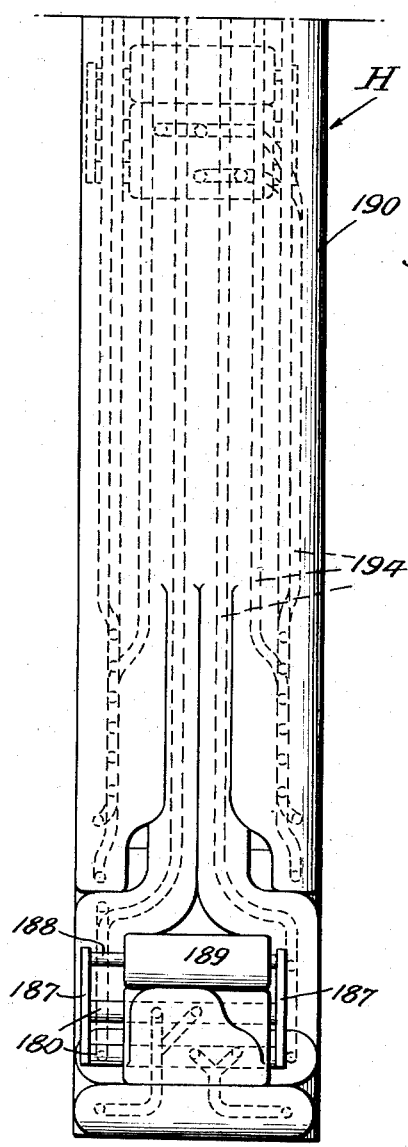
Figure 37A is an elevation showing the left side of Figure 34A.
Figure 40:
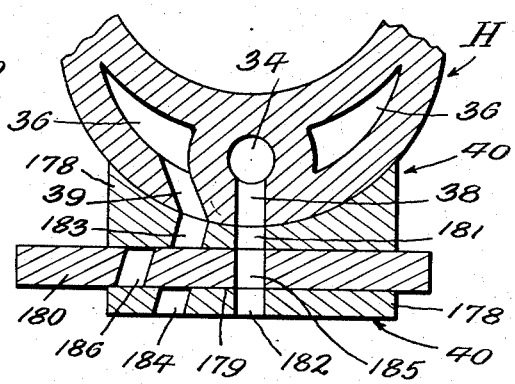
Figure 40 is a section on the line 40—40 of Figure 38.
Figure 41:
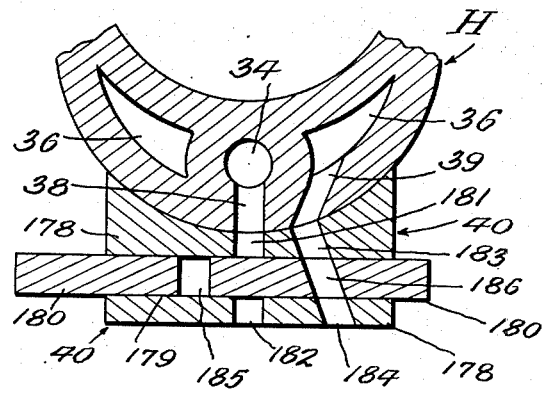
Figure 41 is a section on the line 41—41 of Figure 38.

Similarly, not all the solenoid valves have been shown in place in the smaller scale figures but a sufficient number of these indicated to make plain the general arrangement and the larger scale Figures 34 to 41 fully disclose one complete arrangement of such valves as used with one of the telescopic hangers.

The overhead crane F

In the present showing only those features of the crane having direct reference to this invention are disclosed. This has been done in order to avoid complications and unnecessary views in the drawings. Where a single tier of load receiving compartments is all that exists in each warehouse, such tiers being disposed opposite each other in the two warehouses, no means for driving the crane F along the rails D is necessary. Where several tiers are provided it then becomes necessary to provide means to propel the crane along the runway and to this end suitable means is provided which may be controlled from a cage carried by the crane or from a point remote from the crane. Propelling drives and their controls are well known in the prior art and, as no claim is made to either the drive or controls, it is not deemed necessary here to show or describe the same.

Also there is used in connection with the crane F suitable pumps and accumulators to supply the hydraulic lift means H, but here again such pumps and accumulators in their specific construction for the means H are old and well known and are accordingly not shown in detail. It may be mentioned, however, that where it is intended that the crane should move along the crane runway it will probably be advisable to mount such pumps and accumulators on the crane structure. If the crane is stationary, as with single tier warehouses, the pumps and accumulator means may be either mounted on the crane or may be installed more or less remote from the crane and connected by suitable piping to the transfer bridge supporting means H at their crane connected ends.

In the actual structure of the crane there is provided a frame including longitudinal members 10 and transverse end members 11 to which the longitudinal members are secured as by welding, riveting or other suitable means. Other transverse members 12 connect the longitudinal members between the end members 11. Fixed to each of the end members 11 is a pair of castings 13 from each of which extends upwardly a pair of inverted triangular arms 14. Each pair of these arms is spaced to embrace the runway rails D. From the oppositely disposed upper corners of each pair of arms 14 extend stub shafts 15 carrying the crane supporting wheels 16 which are so spaced as to allow them to freely pass the rail supports 17. The wheels 16 engage on top of the rails D adjacent the sides thereof. Extending from each of the castings 13 is a heavy shaft 18 the united resistance of which is sufficient to resist the bending and shearing stresses due to the hydraulic means H, the transfer bridge G with its complete equipment and the maximum load carried by this bridge.

*Transfer bridge supports H*

Each of the supports H includes a parallel telescopic hydraulic cylinder lift indicated respectively at K and L. These cylinder lifts K and L are connected at their upper ends to a head casting 19 and extending through the upper part of the casting 19 is a bore 20 for the reception of shaft 18. This lift K includes an upper cylinder 21, a middle cylinder 22 and a lower cylinder 23, these cylinders being so nested as to produce fluid proof fits each within the next lower. Similarly, each lift arrangement L has an upper cylinder 24, a middle cylinder 25 and a lower cylinder 26 nested and fitting one within another as in the lift arrangement K. Fitted in the lower cylinders 23 and 26 are the upper ends of lift rods 27, 27' each having an eye 28 at its lower end for connection to the transfer bridge G in a manner later to be described.

The casting 19 forms the head for the cylinders 21 and 24. As shown in Figure 14, the head casting 19 is provided with a passage 29 closed at one end and open at the other to afford connection to the source of supply, wherever located, of operating fluid under high pressure. At each side of the passage 29 there is provided a low pressure exhaust passage 30 closed at one end and open at the other for connection to return conduits leading to the source of supply. A supply port 31 opens from the passage 29 into the cylinder 21 axially thereof, and this port is provided with a valve 32 suitably controlled as will be described. The wall at the upper part of the cylinder 21 below the closed ends of the passages 29 and 30 is thickened as at 33 to provide room for a vertical passage 34 which opens into the passage 29 at 35. At each side of the passage 34 in the thickened wall is a passage 36 and these passages open at their upper ends through ports 37 into the exhaust passages 30. At vertically spaced intervals in the height of the wall 33 pairs of spaced ports 38 open from the passage 34 through the thickened wall, and similarly ports 39 open through said wall from the passages 36. These ports are controlled by solenoid controlled valves 40 in such manner that the passage 34 may be connected to or shut off from the passages 36. But one such valve is here shown, but each of the vertically spaced groups of ports 38 and 39 will be controlled by a like valve.

The wall between the cylinders 21 and 24 is, at its upper part, of considerable thickness, and an arcuate passage 41 extends downwardly from the upper end of the thick wall, this passage 41 opening into the passage 29 at 42. At the lower end of the passage 41 there is provided a pressure release chamber 43 and from the top of this chamber extends a pair of vertical passages 44 which open into the passages 30 through ports 45. The fluid tight fit of the movable cylinders 25 and 26 is attained by the fit of the upper ends 46 while the walls of these cylinders which are, in plan, arranged in spaced relation and are concentric with the axis of the lift arrangement L. As here shown, these spaces are three in number. This is the number desirable for use in case the lift arrangement L involves the combination of three telescopic cylinder elements and a telescopic piston rod so that there are three pressure spaces 49 to be controlled. Obviously, if more than three cylinder elements are similarly arranged, there will be a corresponding number of pressure spaces to which fluid under pressure must be governably supplied and withdrawn. These cylinders are reduced in thickness below said heads as at 47. This is best shown in Figure 13. Similarly, the piston rod 27' has an enlarged upper end 48 to produce the proper fit in cylinder 26, the lower part of the rod being spaced from the wall of this cylinder. This construction provides a concentric series of annular chambers 49 having pressure receiving faces 50 at their upper ends and other pressure receiving faces 51 at their lower ends. Ports 52 afford communication between the spaces 49 and between the center space 49 and the passage 41. It is to be noted that each shoulder 50 faces the shoulder 51 of the next outwardly positioned cylinder so that pressure within the spaces 49 tends to retract the piston rod and cylinders one within the other so long as such pressure is maintained. At their lower extremities the cylinders are again increased to produce fluid proof fits between the parts. In the thick lower parts of the cylinders 24, 25 and 26 there is provided a series of chambers when moved out of such registry, upon the piston being in a second position in its chamber, will effect closing of said ports 52. One control chamber indicated at 53 has fitted therein a piston 54 carrying a piston rod 55 which passes up through a bore 56 and across the port 52 in the wall of cylinder 26. At its upper end the rod is shaped so that an opening 57 is formed therein which registers with said port opening 52 in one position of the piston 54 in the chamber 53. From each end of the chamber 53 leads a passage 58 for the supply and exhaust of fluid under pressure and the direction of flow through these passages is controlled by a suitable solenoid actuated valve (not here shown in connection with Figure 13). It will now be seen that if fluid under pressure be admitted through one passage 58 and exhausted through the other passage, the piston and the valve controlled thereby will move in accordance therewith. In the lower part of cylinder 25 is a pair of chambers 59 each having a piston 60 movable therein. This piston 60 carries a rod 61 in all respects like the rod 55 and serving to open and close the ports 52 at cylinder 25. Also inlet and outlet ports 62 are provided for the chamber 59 and this, as with chambers 53, are controlled by a solenoid actuated valve not shown. It will also be seen in Figure 13 that these passages or ports 62 lie partly in the cylinder 25 and partly in the cylinder 24, the two parts registering only when the cylinder 25 is in its full upper position in the cylinder 24. Similarly, in the thick lower end of cylinder 26 there is provided a pair of chambers 63 wherein are pistons 64 carrying valve stem rods 65 carrying valve means at their upper ends controlling ports 52 in cylinder 26. Upon total collapse of the cylinders 25 and 26 in cylinder 24 passages of ports 66 extend from the ends of chamber 63 through the walls of cylinders 25 and 24, these passages automatically closing when the cylinders 25 and 26 are protracted with respect to cylinder 24 or with respect to each other. The flows through the passages 62 and 66 are controlled like that through the passages 58 by suitable solenoid actuated valves not shown in Figure 13.

Attention is now called to the fact that Figure 13 is somewhat diagrammatic in its disclosure relative to the chambers 59 and 63 since, as may be seen from Figures 16 and 18 their axes do not lie in the same radial plane of their cylinders as does the chamber 53. The proper positions of the chambers, the valve arrangements and the passages are, however, correctly disclosed in their individual arrangements in Figures 13A, 13B and 13C.

Spaced at the end of the arcuate row of chambers 53, 59 and 63 are control chambers 67 for the exhaust passages 44 governing communication between the space 49 around the rod 27 and the exhaust passages 30. It is not deemed necessary to further show the arrangement of the chambers 67 as it is substantially that just described relative to chambers 53, 59 and 63.

Again referring particularly to Figures 13, 8 and 9, it will be seen that in the head of cylinder 24 there is formed a passage 68 connecting with the exhaust passages leading to ports 45. In the heads of each of cylinders 22 and 23 there is provided a port 69 and extending down from the top of the rod 27 is a passage 70 terminating at its lower end in a port 71 opening laterally through the wall of this tubular piston rod in spaced relation above its eye 28. Thus the port 71 may be placed in communication with the supply passage or closed off from connection thereto in accordance with the position of the valve 32. Similarly, the heads of cylinders 25 and 26 are provided with ports 72 and the piston rod 27' has an exhaust passage 73 leading down from its upper end and terminating in a lateral port 74 adjacent its lower end. Thus the port 73 has uncontrolled communication with the exhaust passages 30 at all times.

The transfer bridge G

In the construction of the transfer bridge as here disclosed there is provided as shown (Figures 5, 6, 23, etc.), a generally rectangular frame having at each end a pair of structural members 75 here shown as I-beams. Each pair of I-beams has preferably an underlying tie plate 76 to secure the beams in fixed relation. The ends of these beams extend beneath the supporting structures H and pins or bolts 77 pass through the eyes 28 of the supporting structures H. Connecting the pair of beams 75 at one end of the frame with the like beams at the other end thereof are pairs of spaced channel members 78 which rest on the said beams and are rigidly secured thereto. Between each pair of channels extends a track rail 79 which, upon the transfer bridge being in position to deliver a retractable storage bed into or receive a retractable storage bed from a warehouse, alines with a similar rail 80 in such warehouse. On these rails may be supported a carrier or retractable storage bed indicated in general at 81. This retractable storage bed is of sufficient area and capacity to support the total load that may be imposed thereon. The retractable storage bed 81 includes a floor 82 having spaced elevated load supporting portions 83 and 84, the former also, as will be explained, constituting wheel housings. The low spaces 85 between this elevated portion provide room for insertion of lift truck forks, and thereby eliminating the necessity for a pallet, to permit insertion of lift truck forks under a master load of product, chains, ropes, tongs and other load handling apparatus (not shown) of a construction commonly used in handling weights of considerable magnitude. As shown in Figures 3 and 4 pairs of spaced bearings 86 may be mounted under the raised portions 83 to receive the axles 87 of flanged wheels 88. Alternatively, the bearings 86 may be replaced by angle irons 89 fixed beneath the floor 82 and supporting said axles and wheels. Furthermore, the members 89 serve to strengthen the floor 82 against flexing under load. The wheels 88 roll on the rails 79 and 80 and thus support the load carrying retractable storage bed for free movement into and out of the warehouse compartments.

Between each pair of rails 79 there is mounted two pairs of telescopic retractable storage bed actuating devices one of each pair of which constitutes a pusher device 90 as for pushing retractable storage beds off the transfer bridge into storage spaces A and the other of which constitutes a puller device 91 for pulling retractable storage beds onto the bridge. The distribution of these pushers and pullers is well seen in Figure 5, and the arrangement there shown is such that the devices at one end of the bridge act to push a retractable storage bed into one of the warehouses A or pull a retractable storage bed from warehouse A onto the transfer bridge while the devices at the opposite end act in the opposite directions in communication with the other warehouse A.

In Figure 22 the nested telescopic arrangements of the pusher 90 and puller 91 are disclosed, and it will be observed that there is a close analogy of the arrangements here shown and those of the suspension devices previously described. Consider first the pusher shown in this figure and to a larger scale in Figure 33. It being remembered from Figure 5 that the pairs of cylinders have adjacent ends at the longitudinal central part of the transfer bridge, these adjacent ends may be termed for convenience the inboard ends while the ends near the bridge ends may be termed the outboard ends. The puller and pusher arrangements are unitarily formed as shown in such sections as are shown in Figures 30 and 31. In the pusher there is formed an outer cylinder 92 having a head 93 at its inboard end, and at its outboard end the wall of cylinder is thickened inwardly as at 94 to provide a pressure receiving inwardly facing shoulder 95. In the head 93 there is formed a valve chamber 96 from which a port 97 extends through the center of the head. Slidable in the chamber 96 is a D-valve 98 the position of which is controlled by a solenoid 99. Opening from the chamber 96 is an inlet passage 100 and an outlet passage 101 arranged on opposite sides of the port 97 and so spaced that when the valve is in the position shown in Figure 28 the inlet passage 100 is connected to the port 97 but when the valve 98 is at the other end of the chamber 96 the port 97 is placed in communication with the exhaust passage 101. Within the cylinder 92 is a second cylinder 102 having an inboard end fitted fluidtight in cylinder 92, and this end is provided with a head 103 having a port 104 centrally thereof alining with the port 97. The central portion of the cylinder 102 has its outer diameter reduced to provide an annular pressure space 105 between cylinders 92 and 102 and a pressure receiving shoulder 106 confronting the shoulder 95. At its outboard end the cylinder 102 has its internal diameter reduced as at 107 to provide an inboard facing pressure shoulder 108. Within the cylinder 102 is an inner cylinder 109 having a head portion fitting closely in the cylinder 102 and provided with a port 110 alined with the ports 97 and 104. The central portion of this cylinder is reduced in outside diameter to provide a pressure space 111 and a pressure receiving shoulder 112 confronting the shoulder 108. The outboard end 113 of the cylinder 109 has its internal diameter reduced to provide an inboard facing pressure receiving shoulder 114. Within the cylinder fits a piston 115 from which a piston rod of reduced diameter 116 extends with a close fit through the outboard end of the inner cylinder 109. This provides around the rod 116 a pressure space 117 having at its inboard end a pressure receiving shoulder 118 confronting the shoulder 114.

Reference being now had to Figure 22, it will be seen that there is no difference in construction, except for the outboard ends of the piston rods. In consequence, the same reference characters which have been used for the pusher arrangement will be used for the puller arrangement for the parts of both which are identical in structure and function. In both the pusher and the puller parts a port 119 is formed in the thin part of the wall of cylinder 92 near the outboard end 94, a port 120 is similarly formed in the wall of the inner cylinder 102 and a third like port 121 is formed in the wall of cylinder 109, these ports being in the lower parts of the cylinder walls. In each of the outboard ends is a chamber 122 wherein is a piston 123 carrying a rod 124 which extends longitudinally of the cylinder walls and formed at their ends 125 are valves controlling the ports 119, 120 and 121. The cylinder block formed by each pair of pusher and puller cylinders is thickened downwardly as at 126 and the inboard end forms the head 93. Below each cylinder 92 is a passage 127 arcuate in cross section and this passage extends from the port 119 to the inboard head end where it connects by a port 128 with a passage 129. The passages 129 are connected by a passage 130 whereinto ports 101 open. The ports 100 are connected by an exhaust passage 131 which opens into an exhaust passage 132 leading to an exhaust chamber 133. From the chamber 133 exhaust passages 134 lead back to a transverse exhaust passage 135 formed in a downward extension 136 of the head. The chambers have ports 137 leading from their ends to open outwardly through the walls of the cylinders in which they are located in the inner and middle cylinders. The middle cylinder has passages 138 which register with the ports 137 of the inner cylinders upon the inner cylinder being fully retracted. These passages 138 also register with passages 139 upon the middle cylinder being fully retracted. This construction is clearly shown in Figures 32 and 33. Ports 140 lead from the passage 129 to the exterior of the cylinder block and solenoid controlled valves, such as shown at 40 in Figure 13, govern connections between ports 140 and the outer ends of passages 139. The passage 130 opens outwardly at one end to afford connection with a supply pipe 141 leading to a supply passage 142 in a manifold 143. This passage 142 is connected to the port 74 (Figure 13). Similarly, a pipe 144 connects with exhaust passage 145 in manifold 143 and with port 71 (Figure 13). Passage 135 connects the exhaust passages 134 which are connected with chamber 133 to pipe 144 which connects with exhaust passage 145 in manifold 143 (Figure 24).

As before stated the puller and pusher cylinder devices differ only in the outboard end of the piston rods 116. The pusher rod has a plain blunt end which engages depending arms 147 fixed at both ends of the retractable storage bed 81. The puller pistons, however, project beyond the cylinders, and there are provided each with a head 148 forming a vertical cylinder for the reception of a piston 149 (see Figure 27). From the upper end of the cylinder a passage 150 which extends in an inboard direction through the rod 116 to open laterally by a port 151 (Figure 22) into the pressure space around the rod 116. A spring 152 urges the piston upwardly and projecting from the piston through the top of the cylinder is a piston rod 153 carrying a roller 154. Projecting from the ends of the retractable storage bed in the vertical plane of the rod 116 is a bracket 155. An arm 156 has its upper end bifurcated to straddle this bracket and be secured swingingly thereto by a pin 157. A tension spring 158 has one end secured to the arm 156 and the other fixedly attached to the truck 81 so that the arm may be swung outwardly by the yielding of the spring. However, the arm 156 cannot swing inwardly because of engagement with the truck body. A finger 159 extends downwardly from the arm and lies in the path of the roller 154. As clearly shown in Figure 32, protraction of the rod 116 will swing the arm outwardly until the finger 159 slides over the roller 154. Whereupon the spring 158 will restore the arm to vertical position so that retraction of the rod will engage the finger and move the retractable storage bed 81 onto the transfer bridge.

Stabilizers

Upon the transfer bridge G having been positioned in any desired position for the reception of a retractable storage bed or storage of a retractable storage bed, it is desirable to steady the bridge in such position so as to keep the rails 79 and 80 in alinement. To effect this certain stabilizing devices are carried by the bridge, the location of these stabilizers being shown in Figure 5 and the constructional details being shown in Figure 21. These devices are indicated in general at 160 and are located at the corners of the transfer bridge.

Each stabilizer has a body portion 161 which has a vertical passage 162 for fluid under pressure and an exhaust passage 163 connected respectively by a duct 164 with the pressure supply for the cylinders and by a duct 165 with the exhaust line from said cylinders. A valve chamber 165A extends across the upper parts of the passages 165 and wherein is slidably mounted a valve 166 having a port 167 therein. In one position of this valve the port 167 affords communication between the lower and upper parts of the passage 163 and closes the passage 164. In its other position passage 164 is opened and passage 163 is closed. A stem 168 extends from the valve and projects from the body to form the core around which the windings of a solenoid 169 are arranged. A compression spring 170 surrounds said stem and urges the valve to the position shown in Figure 21. The upper ends of the passages 162 and 163 open at their upper ends into a chamber 171 communicating by a port 172 with a cylinder 173 wherein is mounted a piston 174. Projecting through the outboard end of the cylinder 173 is a rod 175 which is carried by the piston and has on its outer end a presser foot 176. A spring 177 surrounds the inner end of the piston rod and urges the piston to retract the rod.

The foot 176 will engage against a warehouse compartment J framework upon pressure being exerted by fluid in the cylinder, and this is effected by the action of the solenoid which, upon energization, will move the valve to the position connecting the lower and upper parts of the passage 164. When the solenoid is de-energized the exhaust passage 163 will be opened, the rod 175 will be retracted and the foot 176 freed from pressing against the warehouse compartments J framework.

The solenoid controlled valves

In such figures as Figure 13 it will be seen that the passage 34 has ports 38 opening outwardly from said passage. It will also be seen that the chambers 53, 59 and 63 have ports at their ends which, upon the complete nesting of the cylinders 25 and 26 and the piston 27 within the cylinder 24, open outwardly of the cylinder block. The port openings through said block are indicated at 58, 62 and 66. This construction has been previously described and need not here be further explained. As previously shown and described in relation to Figure 15, the exhaust passages 36 likewise have ports 39 opening to the exterior of the block 39.

In order to explain the manner in which pressure and exhaust connections are made between ports 38 and 39 and the ports to be connected thereto, reference will now be had to Figures 34 to 41, inclusive. The ports 38 are arranged in vertically spaced pairs, and spaced laterally in one direction from the upper port 38 is a port 39. Also spaced laterally in the opposite direction from the lower port 38 of the pair is a second port 39. These ports are thus arranged in spaced sets of four. Attached to the cylinder block at each group is a control valve 40 (Figures 34 and 34A). Each of these valves has a body 178 wherethrough extends a vertically spaced pair of transverse passages 179 wherein are slidably mounted the reciprocable valve members 180. The valve body has a port 181 therein leading to the upper valve chamber and also has a port 182 alined with port 181 and opening from said upper chamber to the exterior of the valve body. Similar ports 183 and 184 are alined with the upper port 39 and the group. The upper slide valve has a port 185 and a second port 186 spaced from the port 185. The spacing of the ports 185 and 186 is such that when the port 185 registers with and connects ports 181 and 182, the port 186 will be out of registry with the ports 183 and 184, but when the valve is moved to bring the port 186 into registry with ports 183 and 184 the port 185 will be out of registry with the ports 181 and 182. The arrangement at the lower chamber level is the same as in the upper chamber level except at the lower level the ports 183 and 184 are spaced laterally from the ports 181, 182 and 185 in a direction opposite that of the upper level. The ends of the slides 180 are connected by bars 187 so that these slides may move simultaneously in the same direction. The bars 187 project above the valve body and are connected by a core 188 reciprocable in solenoid winding 189, which winding is arranged to cause desired operational shifting of the slides 180. Also it will be seen that when the upper port 185 is in registry with ports 181 and 182 the lower port 185 will be out of such registry and the reverse of this will be true upon shift of the slide 180 from the position of Figure 38 to that of Figure 39.

In order to properly pass fluid under pressure or in exhaust respectively from the ports 182 and to the ports 184 there is provided a manifold 190 having ports 191 registering with the ports 182 of each valve and ports 192 similarly registering with the ports 184 of each valve. The ports 191 and 192 lead to duct 193 outlet ports such as are shown at 194 for connection, for instance, with the ports 58, 62 and 66.

The foregoing arrangement is described particularly with reference to the transfer bridge suspension means and substantially the same arrangement will be used in connection with the horizontal pusher and puller cylinders on the transfer bridge.

Power plant M

It has been explained that the power plant used in connection with the apparatus previously described may be located on the traveling crane frame by preference but may also be carried by the transfer bridge or be stationarily located elsewhere if found desirable. Naturally a stationary power plant will necessitate flexible conduits forming supply and exhaust lines for the fluid used in operating what may be termed the active parts of the device. Such active parts include, inter alia, the telescopic supports H for the transfer bridge G and the telescopic hydraulic pusher and puller cylinders 90 and 91 on that bridge.

A suitable power plant for the purpose of this invention is here shown in Figures 42 to 44 and is here shown arranged for direct connection to the heads 19 and thus to be carried on the frame of the crane F. However, in these figures no supporting frame is shown but it is to be understood that the elements now to be described will be supported in any suitable manner.

In Figures 42 and 43 there is shown a battery of fluid pumps 195 arranged in two rows of four each, each pump in one of the rows being alined with a corresponding pump in the other row. Thus these pumps have adjacent ends and remote ends, the axes of all the pumps lying in a common horizontal plane. It is to be noted that the devices 195 are referred to as pumps since a compressible fluid would not have the effect of securing positive interaction of the movable parts previously described. Extending along opposite the lower parts of the remote ends of the pumps are accumulator cylinders 196 which are connected to the outputs of the pumps 195 by pipes 197. As here shown the pumps are of the rotary type and have shafts 198 suitably coupled to motors (not shown) for actuating the pumps. These accumulators are preferably provided with suitable means (not shown) of a kind common to hydraulic accumulators for maintaining uniform fluid pressure in the actuating fluid under all conditons of operation. The accumulators 196 are connected to the pressure receiving passages of the heads 19 by pipes 199 which may be rigid if the plant is supported on the crane or transfer bridge or flexible if stationarily supported.

The exhaust passages 30 of the heads 19 have exhaust pipes 200 leading from the exhaust passages 30 of said heads 19. The pipes 200 are connected to an upper reservoir 201 which extends along between the upper parts of the rows of pumps. The reservoir 201 is connected by ports 202 with a lower reservoir 203 and from the latter pipes 204 lead to the intake sides of the pumps 195.

In the operation of this power plant the pumps will drive fluid to the accumulators, from there to the heads 19 from which it will pass to the suspension devices H to effect retractive telescoping of the moving parts of the hangers H, the cylinders 90 and 91, thence back to the heads 19 through exhaust passages as described, from the heads 19 to the reservoirs and thence to the pump intakes.

*General operation*

For a general understanding of the operation of this invention certain assumptions will be made. It will be assumed that the circuits through the solenoids controlling the several valves which in turn control the fluid flow will be operated from a so-called program panel to effect operation of the valves in proper sequence. This program panel forms no part of the present disclosure, but it may here be mentioned that the electrical arrangement will be of the same general character as that used in elevators in buildings wherein pushing a button closes circuits in such manner that, upon further closing a starting circuit, the elevator cage will travel to the floor or stage pertaining to that button and stop when such floor is reached and then effect establishment of circuits controlling the cage and hall doors in proper sequence.

It will further be assumed that the suspension devices H will be fully protracted as shown in Figures 8, 8A, 9 and 9A, thus positioning the transfer bridge at its lowermost point of vertical travel. It will also be assumed that a load M is in position on the carriage of said transfer bridge and that the pusher and puller cylinders 90 and 91 are in full telescopic retraction.

Since the operations of the four supporting devices H are identical and simultaneous, the sequence of operations in but one of this device will be given. It is here to be noted that the hangers H have in each outer cylinder two cylinders and a piston rod thus forming three movable telescopic elements forming three stages of vertical movement. The cylinders 24, 25 and 26 and the rod 27 effect the actual lifting stress. In the above described position of the hanger elements with the pump at rest the ports 52 will all be open. If it be desired to move the transfer bridge one stage upwardly the proper button is pressed. This will close the motor circuits of the pumps 195 and simultaneously act on the valves 40 to close the ports 52 in the cylinders 25 and 26 so that the chamber 49 between cylinders 24 and 25 will receive high pressure fluid. Also, at times, the interiors of cylinders 21, 22 and 23 will, by the action of other valves 40, be placed in connection with exhaust passages 30 in the head 19. The pressure of the fluid in the space 49 around cylinder 25 will cause that cylinder to rise and carry with it cylinder 26 and 27'. When this cylinder is at its upper limit the circuits to the solenoids of the valves 40 effecting the sequence of operations will be broken and the transfer bridge will be broken but the ports 52 which have been closed will remain closed and the transfer bridge will be held in raised position. It will be noted, from Figure 13, that the chamber 50 will then have port openings leading to the outside of cylinder 26 at 62. During this movement of the cylinder 25 upwardly the spaces above the cylinders 25 and 26 and the rod 27' will be open to the exhaust. Simultaneously with the foregoing the solenoid controlled valve 32 is moved to permit fluid under pressure to pass through the heads of cylinders 22 and 23 to the hollow rod 27. The second and third stages are effected in a similar manner, the pressing of the second stage button closing only the port 52 in cylinder 26 so that both this cylinder and cylinder 25 assume the positions shown in Figure 13 and the pressing of the third button leaves all ports 52 open so that all ports are as shown in Figure 13.

As previously described the hollow rod 27 supplies the transfer bridge with fluid under pressure. Upon the above mentioned valves having their solenoids de-energized the solenoid 169 is at once energized to move the valve 166 and cause the foot 176 to engage the frame of the warehouse compartments J.

If now it is desired to move the retractable storage bed and its load off the transfer bridge a button is pressed which establishes step-by-step energization of the solenoids of certain of the valves 40 of the pusher cylinder and the valves 40 move to place the pressure spaces of the pusher successively under pressure as in the vertical cylinders and cause the piston and rod 46 and cylinders 102 and 103 to move to fully protruded position. Subsequent to this the solenoid 99 is energized to move the valve 98 to connect the puller to the exhaust rod 27. After the valve 98 has been shifted the program device acts to reverse the action of the valves 40 whereby the spaces around the rod 116 and cylinders move into connection with the exhaust and thus effect telescopic retraction of said rod and cylinders.

In moving the transfer bridge, a button for the stage desired is pressed which effects solenoid action on the suspension block valves to cause the pressure spaces to become exhaust spaces in reverse order to that in which they operated as pressure spaces.

To pull a retractable storage bed from a warehouse compartment J the proper button is pressed which produces in the puller a sequence of movement to complete protrusion, shifting from pressure to exhaust and complete retraction.

What is claimed is:

1. The combination with an overhead bridge crane, of a platform constituting a transfer bridge suspended from the crane by telescopic multicylinder hydraulic means controlling the spacing of the transfer bridge below said bridge crane, means to control said hydraulic means and regulate said spacing, a remotely controlled solenoid actuated hydraulically operated valve controlling said last mentioned means, and stabilizer means carried by said transfer bridge and holding the same stationarily in adjusted position, said stabilizing means including a hydraulic cylinder having inlet and exhaust openings, a plunger in said cylinder and carrying a pusher head on its outer end, and means to control the movement of said plunger.

2. The combination with an overhead bridge crane, of a platform constituting a transfer bridge suspended from the crane by telescopic multicylinder hydraulic means controlling the spacing of the transfer bridge below said bridge crane, fluid supply means having inlet and outlet ports, conduits connecting said ports to said hydraulic means, valve means controlling the direction of flow through said conduits, a remotely controlled solenoid actuating said hydraulically operated valve means, and stabilizer means carried by said transfer bridge and holding the same stationarily in adjusted position, said stabilizing means including a hydraulic cylinder having inlet and exhaust openings, a plunger in said cylinder and carrying a pusher head on its outer end, means to control the movement of said plunger, a valve controlling said inlet and outlet openings, electrical means connected to and operating said valve and remote control means for said electrical means.

3. The combination with an overhead bridge crane, of a platform constituting a transfer bridge suspended from the crane by telescopic multicylinder hydraulic means controlling the spacing of the transfer bridge below said bridge crane, means to control said hydraulic means and regulate said spacing, a remotely controlled solenoid actuated, hydraulically operated valve controlling said last mentioned means, stabilizer pins mounted for protraction and retraction at the ends of the transfer bridge, and hydraulic means controlling the action of said pins, said stabilizing means including a hydraulic cylinder having inlet and exhaust openings, a plunger in said cylinder and carrying a pusher head on its outer end, means to control the movement of said plunger, a valve controlling said inlet and outlet opening, electrical means connected to and operating said valve and remote control means for said electrical means.

4. The combination with an overhead bridge crane, of a platform constituting a transfer bridge suspended from the crane by telescopic multicylinder hydraulic means controlling the spacing of the transfer bridge below said bridge crane, fluid supply means having inlet and outlet ports, conduits connecting said ports to said hydraulic means, valve means controlling the direction of flow through said conduits, a remotely controlled solenoid actuating said hydraulically operated valve means, stabilizer pins mounted for protraction and retraction at the ends of the transfer bridge, and hydraulic means controlling the action of said pins, said last hydraulic means including a hydraulic cylinder for each of said pins and having inlet and outlet openings, valves controlling said inlet and outlet openings in the respective cylinder, and remote control electrical means operating said valves.

5. The combination with an overhead bridge crane, of a platform constituting a transfer bridge suspended from the crane by telescopic multicylinder hydraulic means controlling the spacing of the transfer bridge below said bridge crane, means to control said hydraulic means and regulate said spacing, said controlling means including electrically operated valves, storage beds mounted on said transfer bridge and mounted for movement onto and off the transfer bridge in either direction perpendicular to the direction of horizontal travel of the transfer bridge, and other telescopic multicylinder hydraulic means on the transfer bridge for actuating said storage beds, electrically controlled valves controlling the last hydraulic means and a remote control station actuating the electrically controlled valves for each of the above means.

6. The combination with an overhead bridge crane, of a platform constituting a transfer bridge suspended from the crane by telescopic multicylinder hydraulic means controlling the spacing of the transfer bridge below said bridge crane, fluid supply means having inlet and outlet ports, conduits connecting said ports to said hydraulic means, valve means controlling the direction of flow through said conduits, electrical means controlling the valve means, storage beds mounted on said transfer bridge and mounted for movement onto and off the transfer bridge in either direction perpendicular to the direction of horizontal travel of the transfer bridge, and other telescopic multicylinder hydraulic means on the transfer bridge for actuating said storage beds, valve means controlling the last mentioned hydraulic means, electrical means for controlling the last mentioned valve means, a remote control station, and conductive connections from said remote control station to all of said valve controlling electrical means.

7. The combination with an overhead bridge crane, of a platform constituting a transfer bridge suspended from the crane by telescopic multicylinder hydraulic means controlling the spacing of the transfer bridge below said bridge crane, means to control said hydraulic means and regulate said spacing, storage beds mounted on said transfer bridge and mounted for movement onto and off the transfer bridge in either direction perpendicular to the direction of horizontal travel of the transfer bridge, and other telescopic multicylinder hydraulic means on the transfer bridge for actuating said storage beds, the hydraulic storage bed actuating means on the transfer bridge each including pusher cylinders and puller cylinders for operation in each direction respectively each provided with a bed engaging element, each of said elements including a piston rod, and coacting latching means on the piston rod of the puller element and said bed.

8. The combination with an overhead bridge crane, of a platform constituting a transfer bridge suspended from the crane by telescopic multicylinder hydraulic means controlling the spacing of the transfer bridge below said bridge crane, fluid supply means having inlet and outlet ports, conduits connecting said ports to said hydraulic means, valve means controlling the direction of flow through said conduits, storage beds mounted on said transfer bridge and mounted for movement onto and off the transfer bridge in either direction perpendicular to the direction of horizontal travel of the transfer bridge, and other telescopic multicylinder hydraulic means on the transfer bridge for actuating said storage beds, the hydraulic storage bed actuating means on the transfer bridge each including pusher cylinders and puller cylinders for operation in each direction respectively each provided with a bed engaging element, each of said elements including a projecting piston rod, and a hydraulically actuated latch member at the projecting end of the piston rod of the puller cylinder.

9. The combination with an overhead bridge crane, of a platform constituting a transfer bridge suspended from the crane by telescopic multicylinder hydraulic means controlling the spacing of the transfer bridge below said bridge crane, means to control said hydraulic means and regulate said spacing, storage beds mounted on said transfer bridge and mounted for movement onto and off the transfer bridge in either direction perpendicular to the direction of horizontal travel of the transfer bridge, other telescopic multicylinder hydraulic means on the transfer bridge for actuating said storage beds, other conduits connecting the ports of the fluid supply with the last mentioned hydraulic means, and valve means controlling the direction of flow through the last mentioned conduits, the hydraulic storage bed actuating means on the transfer bridge each including pusher cylinders and puller cylinders for operation in each direction respectively each provided with a bed engaging element, each of said elements including a projecting piston rod, a hydraulically actuated latch member at the projecting end of the piston rod of the puller cylinder, and a coacting latch member pivoted on said storage bed and freely swinging in one direction out of the path of said last latch member upon movement of the first latch member into bed actuating position.

10. The combination with an overhead bridge crane of a platform constituting a transfer bridge suspended from the crane by telescopic multicylinder hydraulic means controlling the spacing of the transfer bridge below said bridge crane, fluid supply means having inlet and outlet ports, conduits connecting said ports to said hydraulic means, valve means controlling the direction of flow through said conduits, storage beds mounted on said transfer bridge and mounted for movement onto and off the transfer bridge in either direction perpendicular to the direction of horizontal travel of the transfer bridge, other telescopic multicylinder hydraulic means on the transfer bridge for actuating said storage beds, other conduits connecting the ports of the fluid supply with the last mentioned hydraulic means, and valve means controlling the direction of flow through the last mentioned conduits, the hydraulic storage bed actuating means on the transfer bridge each including pusher cylinders and puller cylinders for operation in each direction respectively each provided with a bed engaging element, each of said elements including a projecting piston rod, a hydraulically actuated latch member at the projecting end of the piston rod of the puller cylinder, a coacting latch member pivoted on said storage bed and freely swinging in one direction out of the path of said last latch member upon movement of the first latch member into bed actuating position, and spring means normally holding the last latch member in vertically depending position.

References Cited in the file of this patent

UNITED STATES PATENTS

| Number | Name | Date |
| --- | --- | --- |
| 1,114,975 | Fessenden | Oct. 27, 1914 |
| 1,363,442 | Swern | Dec. 28, 1920 |
| 1,507,824 | Gheen | Sept. 9, 1924 |
| 1,605,220 | Cuvillier et al. | Nov. 2, 1926 |
| 1,704,342 | Redpath et al. | Mar. 5, 1929 |
| 1,781,955 | Porter | Nov. 18, 1930 |
| 1,851,502 | Ferris et al. | Mar. 29, 1932 |
| 2,014,351 | Becker | Sept. 10, 1935 |
| 2,223,962 | Mitchell | Dec. 3, 1940 |
| 2,349,389 | Thompson | May 23, 1944 |
| 2,535,961 | Schutt | Dec. 26, 1950 |
| 2,614,800 | Garlinger et al. | Oct. 21, 1952 |

FOREIGN PATENTS

| Number | Country | Date |
| --- | --- | --- |
| 383,758 | Germany | Oct. 18, 1923 |